United States Patent
Hirai

(10) Patent No.: US 8,074,222 B2
(45) Date of Patent: Dec. 6, 2011

(54) JOB MANAGEMENT DEVICE, CLUSTER SYSTEM, AND COMPUTER-READABLE MEDIUM STORING JOB MANAGEMENT PROGRAM

(75) Inventor: Koichi Hirai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 973 days.

(21) Appl. No.: 12/027,499

(22) Filed: Feb. 7, 2008

(65) Prior Publication Data

US 2008/0209423 A1   Aug. 28, 2008

(30) Foreign Application Priority Data

Feb. 27, 2007   (JP) ................. 2007-046434

(51) Int. Cl.
*G06F 9/46* (2006.01)

(52) U.S. Cl. ........ 718/102; 707/640; 707/674; 707/679; 707/680; 707/681; 714/1; 714/2; 714/4.3

(58) Field of Classification Search .............. None
See application file for complete search history.

(56) References Cited

U.S. PATENT DOCUMENTS

| | | | |
|---|---|---|---|
| 5,313,584 A | 5/1994 | Tickner et al. | |
| 6,065,018 A * | 5/2000 | Beier et al. | 707/610 |
| 7,631,220 B1 * | 12/2009 | Hamilton et al. | 714/15 |
| 7,721,290 B2 * | 5/2010 | Horikawa | 718/104 |
| 7,779,298 B2 * | 8/2010 | Challenger et al. | 714/15 |
| 2003/0046341 A1 * | 3/2003 | Fujita | 709/203 |
| 2004/0044642 A1 * | 3/2004 | Fujii et al. | 707/1 |
| 2005/0015643 A1 | 1/2005 | Davis et al. | |
| 2005/0022202 A1 | 1/2005 | Sannapa Reedy et al. | |
| 2005/0283782 A1 * | 12/2005 | Lu et al. | 718/100 |
| 2006/0031270 A1 * | 2/2006 | Nemoto et al. | 707/205 |
| 2006/0089935 A1 | 4/2006 | Clifford et al. | |
| 2006/0143618 A1 | 6/2006 | Fleischer et al. | |
| 2006/0198386 A1 * | 9/2006 | Liu et al. | 370/419 |
| 2007/0236708 A1 * | 10/2007 | Jahn et al. | 358/1.6 |
| 2007/0256081 A1 * | 11/2007 | Comer | 719/316 |
| 2008/0120620 A1 * | 5/2008 | Lett et al. | 718/103 |

FOREIGN PATENT DOCUMENTS

| | | |
|---|---|---|
| JP | A 6-96041 | 4/1994 |
| JP | A 9-265426 | 10/1997 |

OTHER PUBLICATIONS

Kohl, Papadopoulos, "Efficient and Flexible Fault Tolerance and Migration of Scientific Simulations using CUMULVS," Proceedings of the Sigmetrics Symposium on Parallel and Distributed Tools, [Online] 1998, pp. 60-71, XP002540891.

* cited by examiner

*Primary Examiner* — Emerson Puente
*Assistant Examiner* — Hiren Patel
(74) *Attorney, Agent, or Firm* — Greer, Burns & Crain, Ltd.

(57) ABSTRACT

In a job management device: a request reception unit stores job-input information in a storage device on receipt of a job-execution request; and an execution instruction unit sends to one or more job-assigned calculation nodes a job-execution instruction together with execution-resource information, and stores job-assignment information in the storage device in association with a job identifier. When the contents of the job database are lost by a restart of the job management device, a reconstruction unit collects the job-input information and the job-assignment information from the storage device, collects the execution-resource information from the one or more job-assigned calculation nodes, and reconstructs the job information in the job database.

9 Claims, 28 Drawing Sheets

JOB MANAGEMENT DEVICE, CLUSTER SYSTEM, AND COMPUTER-READABLE MEDIUM STORING JOB MANAGEMENT PROGRAM

CROSS-REFERENCE TO RELATED APPLICATIONS

This application is based upon and claims the benefits of priority from the prior Japanese Patent Application No. 2007-046434, filed on Feb. 27, 2007, the entire contents of which are incorporated herein by reference.

BACKGROUND OF THE INVENTION (1) Field of the Invention

The present invention relates to a job management device which instructs a plurality of calculation nodes to execute a job, a cluster system in which the job is managed by the job management device, and a computer-readable medium storing a job management program which is to be executed by a computer so as to realize the functions of the job management device. In particular, the present invention relates to a job management device in which high reliability against failure in the functions of the cluster system is ensured, a cluster system in which jobs are managed by such a job management device, and a computer-readable medium storing a job management program which realize high reliability against failure in the functions of the cluster system.

(2) Description of the Related Art

In order to perform advanced scientific calculation, a number of computers are bundled and used as a single computer system. Hereinafter, such a computer system is referred to as a cluster system, and each computer constituting the cluster system is referred to as a node. Each user uses another computer and inputs a request for calculation to the cluster system. Hereinafter, processing executed in response to such a request is referred to as a job. The job may be a parallel job or a sequential job. The parallel job is executed by a plurality of nodes, and the sequential job is executed by a single process on a single node.

When the cluster system receives a job, the cluster system is required to make one or more nodes execute the job. Therefore, a node which assigns the job to one or more other nodes and manages the operational status of the job at each node is provided. Hereinafter, such a node is referred to as a management node, and the nodes other than the management node are referred to as calculation nodes.

In the cluster system, the management node is aware of the assignment of jobs to the calculation nodes and the operational status of the calculation nodes. Therefore, when the management node fails, information on the assignment of jobs to the calculation nodes and the operational status of the calculation nodes will be lost.

In the case where the cluster system does not have a function of ensuring high reliability against failure in the management node (which is hereinafter referred to as the reliability-ensuring function), even the information on the existence of the job is lost when the management node fails. In this case, it is necessary to re-input the job into the cluster system, and complete jobs currently executed in the calculation nodes before the re-input of the job. However, if the reliability-ensuring function is not provided, there is no way to know the jobs which the cluster system has received before the failure, so that it is necessary to restart all the calculation nodes.

Consequently, the reliability-ensuring function is used. In the conventional reliability-ensuring function, information on the status of the jobs is stored in a file in a job database (DB), which is constructed on a hard disk drive (HDD). Even when the management node fails, it is possible to recognize the currently executed jobs by reading the one or more files from the job database on startup of the management node.

Incidentally, there are two job states, the job-input state and the job-execution state. The cluster system receives a request from another computer in the job-input state, and the job is assigned to and executed by one or more calculation nodes in the job-execution state.

If only the job-input state is managed in the job database, it is possible to recognize each job which should be executed, even after the management node fails. Therefore, the re-input of the job by the user is unnecessary. However, in this case, the operational status of each job is unknown, so that it is necessary to once stop execution of jobs currently executed by the calculation nodes, and restart the jobs from the beginning. Therefore, the operational efficiency of the system decreases. In particular, the scientific calculation needs jobs which take much time to execute, so that re-execution of such jobs from the beginning is extremely inefficient.

Thus, conventionally, both of the job-input state and the job-execution state are managed in a file in the job database constructed on a hard disk drive. In this case, it is possible to recognize the job-execution state, as well as the job-input state, even after the management node fails. Therefore, it is unnecessary to re-input each job into the cluster system, and it is possible to continue the jobs currently executed by one or more calculation nodes as they are. In addition, even when the management node fails, it is unnecessary to execute each job from the beginning. However, in order to store the job-execution state, delay occurs in reflecting information in the hard disk drive as explained below.

According to the ordinary OS (operating system), even when writing of information in a file is instructed, information is written in only a memory in order to increase the operational speed of the system. Thereafter, the updated information in the file is actually written in the disk at predetermined times. That is, the information written in the memory is not immediately reflected in the disk, so that delay can occur all the times. Thus, conventionally, the job-execution state in the disk is not necessarily updated, and the ensuring of the reliability is impeded.

In order to solve the problem of the delay caused by the writing operation, it is possible to consider to reflect in the file in the disk the information written in the memory at the same time as the writing in the memory. However, in this case, since the writing in the hard disk drive is far slower than the writing in the memory, the processing in the system is delayed.

In order to solve the above problem, a technique for ensuring the reliability without using the job database is considered. For example, it is possible to store information on the job-execution state and the environmental settings (which are held by the management node) in the calculation nodes as well as in the management node. When the management node fails, one of the calculation nodes is raised to a management node, so that the calculation node has both the functions of the calculation node and the functions of the management node. Then, the above calculation node collects the job-execution states in the other calculation nodes and executes the functions of the management node. (See, for example, Japanese Unexamined Patent Publication No. 6-96041, which is hereinafter referred to as JPP6-96041.)

However, the technique for ensuring the reliability disclosed in JPP6-96041 has the following problems (i) to (v).

(i) JPP6-96041 discloses no way of coping with parallel jobs. In the case of the parallel job, it is necessary that a plurality of calculation nodes execute the parallel job in corporation with each other. In order to realize the corporation, one of the plurality of calculation nodes which execute the parallel job becomes a job master, and manages details of the job-execution state. In this case, it is difficult to cope with the parallel job unless information unique to the parallel job (such as the information indicating which one of the calculation nodes is the job master) can be restored.

(ii) It is necessary that the calculation nodes store all the information on the parallel job (i.e., all the information necessary for execution of the parallel job). Therefore, in some cases, a great amount of information is required to be transmitted.

(iii) The technique disclosed in JPP6-96041 cannot cope with double failure. That is, when the management node and one or more of the calculation nodes concurrently fail, information indicating the existence of one or more jobs executed by the one or more failed calculation nodes is lost, so that external re-input of the one or more jobs is required. Therefore, it is necessary to externally check whether or not information on jobs which have already been inputted is lost. In other words, unless the information indicating whether or not the information on the jobs which have already been inputted is lost is externally managed, it is impossible to reproduce the lost information on the jobs, so that the reliability of the cluster system deteriorates.

(iv) In order to collect necessary information, access to all the calculation nodes is required. Therefore, processing for the communication becomes inefficient. In particular, in the systems used in scientific calculation, the number of the calculation nodes tends to be great. Thus, when information for managing all the calculation nodes is transferred to a calculation node, the amount of transferred data becomes extremely great.

(v) According to the technique disclosed in JPP6-96041, an attempt to protect information is made by using only the calculation nodes. Therefore, when one or more calculation nodes fail, it is impossible to re-execute one or more jobs which have been executed by the one or more calculation nodes before the failure.

If all or parts of the above problems are solved, it is possible to prevent decrease in processing efficiency while ensuring the reliability of the cluster system.

SUMMARY OF THE INVENTION

The present invention is made in view of the above problems, and the object of the present invention is to provide a job management device, a cluster system, and a computer-readable medium storing a job management program which ensures the reliability of a management node in a cluster system by efficient processing.

In order to accomplish the above object, a job management device connected with a storage device and a plurality of calculation nodes for instructing the plurality of calculation nodes to execute respective jobs is provided. The job management device comprises: a main memory; a job database which is arranged in the main memory, and stores job information on a job-by-job basis; a request reception unit which stores job-input information in both of the storage device and the job database on receipt of a job-execution request for execution of a job, where the job-input information includes details of the job-execution request, a job identifier of the job, and an identifier of a source of the job-execution request; an execution instruction unit which determines one or more of the plurality of calculation nodes to be one or more job-assigned calculation nodes, sends to the one or more job-assigned calculation nodes a job-execution instruction together with execution-resource information, stores, in the job database in association with the job identifier, job-assignment information and portions of the execution-resource information respectively corresponding to the one or more job-assigned calculation nodes, and stores the job-assignment information in association with the job identifier in the storage device, where execution of the job is assigned to the job-assigned calculation nodes, the execution-resource information indicates resources to be used in execution of the job, and the job-assignment information includes a list of the one or more job-assigned calculation nodes; and a reconstruction unit which collects the job-input information and the job-assignment information from the storage device, collects the execution-resource information from the one or more job-assigned calculation nodes, and reconstructs the job information in the job database, when contents of the job database are lost by processing for restarting the job management device.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Preferred embodiments of the present invention will be described below with reference to the accompanying drawings, wherein like reference numbers refer to like elements throughout.

1. Outline

Figure 1:
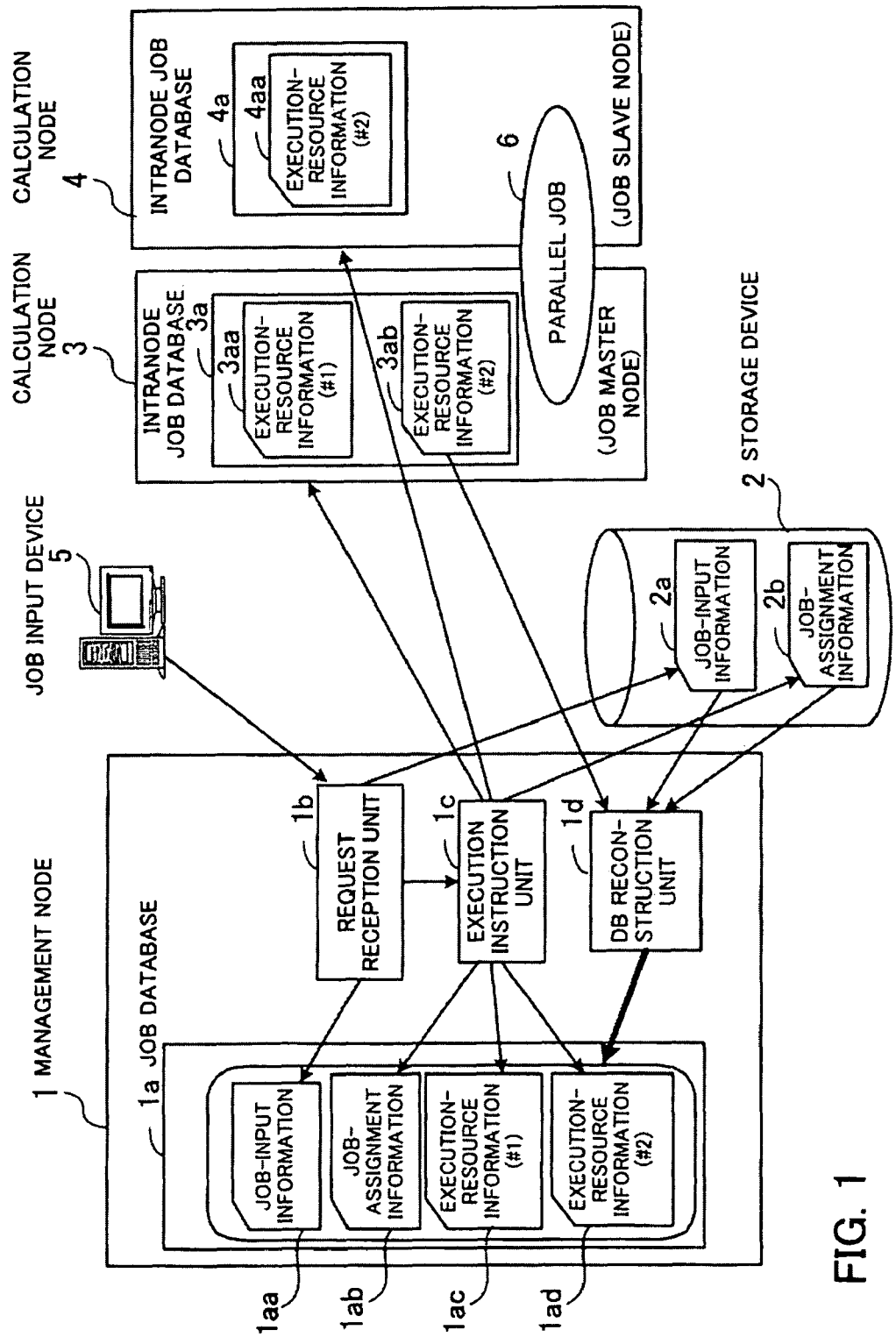
FIG. 1 is a diagram illustrating an outline of a cluster system.

FIG. 1 is a diagram illustrating an outline of a cluster system. The cluster system illustrated in FIG. 1 comprises a management node 1, a storage device 2, and a plurality of calculation nodes (e.g., the calculation nodes 3 and 4 in the example of FIG. 1), and executes a job in response to a request for execution of the job (job-execution request), which is inputted into the cluster system from a job input device 5.

The storage device 2 is connected to the management node 1, and stores job-input information 2a and job-assignment information 2b in association with each job identifier (job ID). For example, each of the job-input information 2a and the job-assignment information 2b is stored in a different file in the storage device 2.

The calculation nodes 3 and 4 execute a job in accordance with an instruction to execute the job (job-execution instruction), which is sent from the management node 1. In the case where the job the execution of which is instructed by the job-execution instruction is a parallel job 6, more than one of the plurality of calculation nodes (e.g., the calculation nodes 3 and 4 in this example) execute the parallel job 6 in corporation with each other. At this time, one of the calculation nodes (e.g., the calculation node 3 in this example) operates as a job master node, and one or more other calculation nodes (e.g., the calculation node 4 in this example) operate as a job slave node.

In addition, the main memories of the plurality of calculation nodes respectively have job databases (job DBs). For example, the calculation nodes 3 and 4 respectively have job databases (job DBs) 3a and 4a. The calculation node 3 (as the job master node) stores in the job DB 3a execution-resource information sets 3aa and 3ab, which are supplied together from the management node 1. The execution-resource information set 3aa contains information on one or more execution resources for use by the calculation node 3 as a calculation node, and the execution-resource information set 3ab contains information on one or more execution resources for use by the calculation node 4 as a calculation node. Similarly, the calculation node 4 (as the job slave node) stores in the job DB 4a an execution-resource information set 4aa, which is supplied from the management node 1. The execution-resource information set 4aa contains the information on one or more execution resources for use by the calculation node 4 as a calculation node.

In the above arrangement, when the calculation nodes 3 and 4 receive from the management node 1 an instruction to send execution-resource information, the calculation nodes 3 and 4 send to the management node 1 the execution-resource information sets stored in the job DBs 3a and 4a, respectively. At this time, the calculation node 3 (as the job master node for the parallel job 6) sends to the management node 1 the execution-resource information sets 3aa and 3ab for all the calculation nodes which should execute the parallel job 6. On the other hand, the calculation node 4 (as the job slave node for the parallel job 6) ignores the instruction to send execution-resource information, and sends no execution-resource information to the management node 1.

The management node 1 comprises a job database (job DB) 1a, a request reception unit 1b, an execution instruction unit 1c, and a DB reconstruction unit 1d.

The job DB 1a is arranged in the main memory of the management node 1, and stores job information for each job. The job information includes a job-input information set 1aa, a job-assignment information set 1ab, and execution-resource information sets 1ac and 1ad. The execution-resource information sets 1ac and 1ad indicate resources used in execution of a job by calculation nodes which should execute the job.

When a request for execution of a job (job-execution request) is inputted from the job input device 5, the request reception unit 1b stores the job-input information sets 2a and 1aa for the job in the storage device 2 and the job DB 1a. The job-input information sets 2a and 1aa include details of the job-execution request, the job ID of the requested job, and an identifier for the source of the job-execution request.

When the request reception unit 1b receives the request for execution of a job (job-execution request) as above, the execution instruction unit 1c determines one or more calculation nodes to be one or more job-assigned calculation nodes, which are calculation nodes to which the job (the execution of which is requested by the job-execution request) is assigned. (In the case where the job the execution of which is requested is a parallel job, more than one job-assigned calculation node is determined for the job.) Thereafter, the execution instruction unit 1c sends a job-execution instruction to the one or more job-assigned calculation nodes, where the execution-resource information sets 3aa, 3ab, and 4aa indicating resources which should be used in execution of the job are attached to the job-execution instruction. In addition, the execution instruction unit 1c stores the job-assignment information set 1ab and the execution-resource information sets 1ac and 1ad for the respective job-assigned calculation nodes in the job DB 1a in association with the job ID, where the job-assignment information set 1ab includes a list of the one or more job-assigned calculation nodes. Further, the execution instruction unit 1c stores the job-assignment information set 2b in the storage device 2 in association with the job ID.

When the information contained in the job DB 1a is lost by restart processing, the DB reconstruction unit 1d collects from the storage device 2 the job-input information set 2a and the job-assignment information set 2b. In addition, the DB reconstruction unit 1d collects the execution-resource information sets 3aa and 3ab from the one or more job-assigned calculation nodes. Then, the DB reconstruction unit 1d reconstructs the job information in the job DB 1a with the job-input information set 2a, the job-assignment information set 2b, and the execution-resource information sets 3aa and 3ab which are collected as above.

The cluster system having the above construction operates as follows.

When a job-execution request is inputted from the job input device 5 into the cluster system, the request reception unit 1b stores the job-input information sets 2a and 1aa in the storage device 2 and the job DB 1a, where the job-input information sets 2a and 1aa include details of the job-execution request, the job ID of the requested job, and the an identifier for the source of the job-execution request.

Subsequently, the execution instruction unit 1c determines one or more calculation nodes to be one or more job-assigned calculation nodes, which are calculation nodes to which the job (the execution of which is requested by the job-execution request) is assigned. Then, the execution instruction unit 1c sends a job-execution instruction to the one or more job-assigned calculation nodes, where the execution-resource information sets 3aa and 3ab indicating resources which should be used in execution of the job by the calculation nodes 3 and 4 are attached to the job-execution instruction sent to the calculation node 3, and the execution-resource information set 4aa indicating resources which should be used in execution of the job by the calculation node 4 is attached to the job-execution instruction sent to the calculation node 4. In addition, the execution instruction unit 1c stores the job-assignment information set 1ab and the execution-resource information sets 1ac and 1ad for the respective job-assigned calculation nodes in the job DB 1a in association with the job ID, where the job-assignment information set 1ab includes a list of the one or more job-assigned calculation nodes. Further, the execution instruction unit 1c stores the job-assignment information set 2b in the storage device 2 in association with the job ID.

Thereafter, when a failure occurs in the management node 1, processing for restarting the management node 1 is performed. When the management node 1 is restarted, the information stored in the job DB 1a is lost. At this time, the DB reconstruction unit 1d collects the job-input information set 2a and the job-assignment information set 2b from the storage device 2, and the execution-resource information sets 3aa and 3ab from a job-assigned calculation node indicated by the job-assignment information set 2b. Then, the DB reconstruction unit 1d reconstructs the job information in the job DB 1a with the job-input information set 2a, the job-assignment information set 2b, and the execution-resource information sets 3aa and 3ab which are collected as above.

According to the cluster system shown in FIG. 1, it is possible to ensure the reliability of the management node 1 by the efficient processing as described above.

Specifically, the job-input information set 2a and the job-assignment information set 2b are stored in the storage device 2, which is connected to the management node 1. The writing of the job-input information set 2a and the job-assignment information set 2b in the storage device 2 is required only when the cluster system receives a job-execution request and when the management node 1 sends the job-execution instruction to the calculation nodes 3 and 4. At this time, the amount of data required to be written according to the cluster system shown in FIG. 1 is smaller than the amount in the case where the execution-resource information set is also stored in the storage device 2. Therefore, according to the cluster system of FIG. 1, it is possible to minimize the delay in the writing operation in the storage device 2.

In addition, since duplicates of the execution-resource information sets are managed by the calculation nodes 3 and 4, the execution-resource information sets can be collected from the calculation nodes 3 and 4 even when the management node 1 fails.

Further, the cluster system of FIG. 1 is greatly different from the technique disclosed in JPP6-96041 in that part of necessary information is stored in the storage device 2 as explained below.

The cluster system of the FIG. 1 has an arrangement which can be used in execution of a parallel job. In order to execute a parallel job, it is necessary to recognize calculation nodes to which the parallel job is assigned. According to the technique disclosed in the claim 3 of JPP6-96041, each computer constituting the system holds a duplicate of data shared by the system. In such a system, when data lost by failure in a management node is collected from the computers, a great amount of data is uselessly collected from the computers. However, in the current cluster systems, a great number (e.g., hundreds or more) of nodes are connected. If the shared data is collected from all of the great number of nodes, a communication traffic jam occurs, so that the restart of operation of the management node can be delayed.

On the other hand, according to the cluster system of FIG. 1, the information which is not unique to each of the calculation nodes and should be shared for management of the cluster system (such as the job-input information set 2a and the job-assignment information set 2b) is stored in the storage device 2. Therefore, it is possible to reduce the communication load in the operation of collecting information. In addition, since the amount of information stored in the storage device 2 is minimized, it is also possible to suppress the decrease in the reliability caused by the delay in the operation of writing information.

Incidentally, the job-input information set 2a and the job-assignment information set 2b stored in the storage device 2 are data necessary for inputting and terminating jobs. However, such data are unnecessary during execution of the jobs. Therefore, even in the case where such data are not held by the calculation nodes, the execution of the jobs is not harmfully affected by the absence of the data in the calculation nodes. In addition, since it is unnecessary to store such data in the main memories, it is possible to efficiently use the memory resources.

Further, since the job-input information set 2a and the job-assignment information set 2b are stored in the storage device 2, even when the management node and one or more calculation nodes concurrently fail, the information indicating the existence of the jobs is not lost. Therefore, execution of each job can be restarted from the beginning without re-inputting a job-execution request from the job input device 5 again.

Furthermore, according to the cluster system of FIG. 1, in order to execute a parallel job, execution-resource information for the job-assigned calculation nodes including the job master node for the parallel job is supplied to the job master node. Thereafter, when the management node 1 is restarted, the execution-resource information is collected from only the job master node, so that the number of data transmissions for collection of information can be reduced.

That is, in the case where a parallel job is executed, it is necessary to manage information over a plurality of calculation nodes. The simplest way of managing information over a plurality of calculation nodes is to supply all the information used in execution of the parallel job to each of the job-assigned calculation nodes. However, it is inefficient to collect information from all the job-assigned calculation nodes when the management node 1 is restarted. Therefore, according to the cluster system of FIG. 1, a job master node is determined among a plurality of job-assigned calculation nodes, and all information necessary for execution of a job is brought together. Thus, it is possible to acquire the necessary information from only the job master node and reconstruct the job DB 1a in the management node 1 for high-reliability processing. Consequently, the number of transmissions for collection of information can be reduced. When the management node 1 fails, the management node 1 is required to be restored as soon as possible. Therefore, it is very important for high-reliability processing to increase the speed of the restoration of the management node 1 by reducing the number of transmissions.

2. First Embodiment

Figure 2:
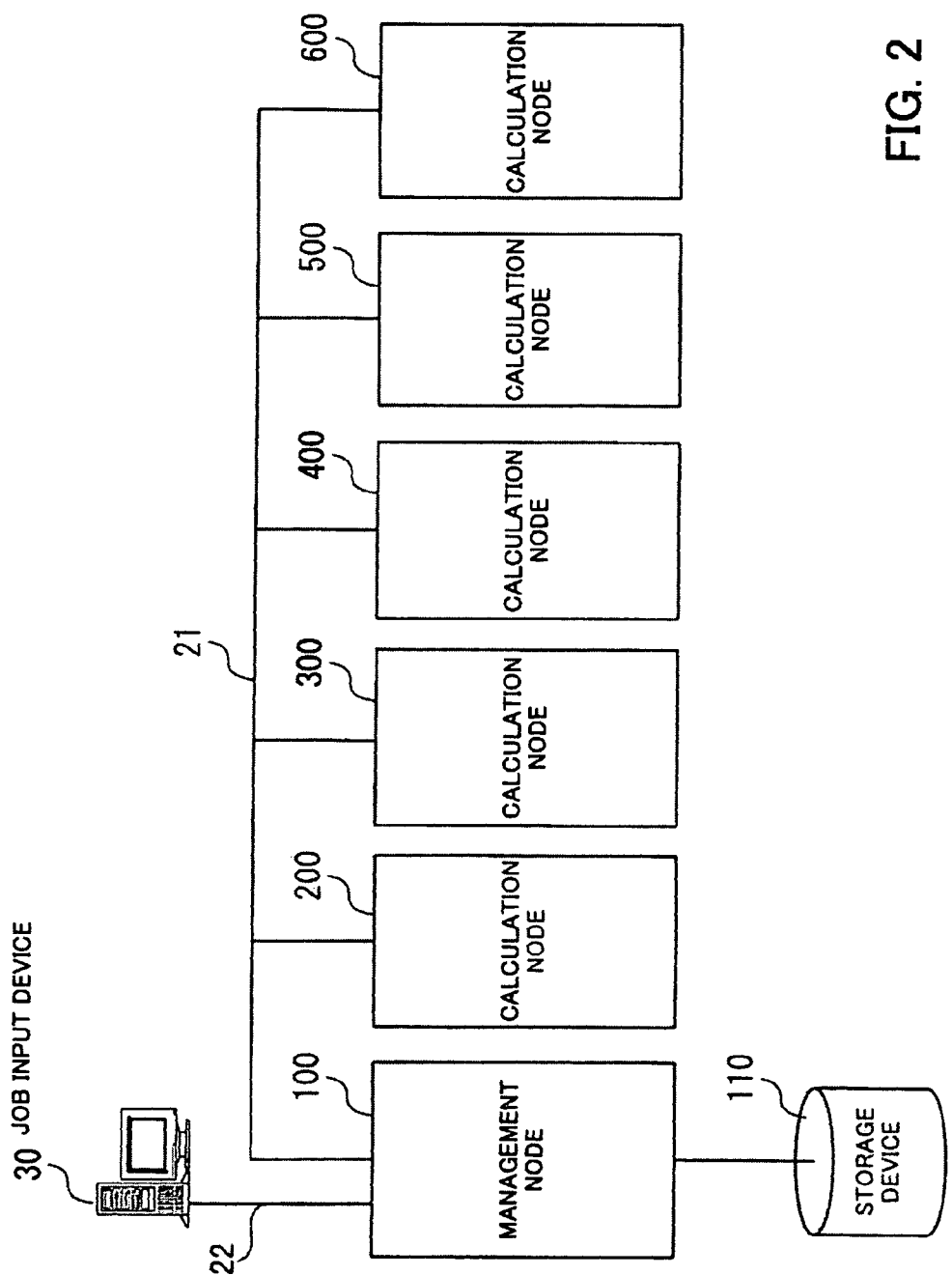
FIG. 2 is a diagram illustrating an exemplary configuration of a cluster system according to a first embodiment.

First, the first embodiment of a cluster system is explained below.
2.1 System Configuration FIG. 2 is a diagram illustrating an exemplary configuration of a cluster system according to the first embodiment. The cluster system according to the first embodiment comprises a single management node 100 and a plurality of calculation nodes 200, 300, 400, 500, and 600.

The management node 100 manages jobs which the cluster system is requested to execute. The job input device 30, which is connected to the management node 100 through a network 22, sends a request for execution of a job (job-execution request) to the management node 100. The management node 100 has a storage device 110, which is realized by a nonvolatile storage medium such as a hard disk drive, and stores details of jobs which the cluster system is requested to execute.

The job input device 30 is a computer used by a user of the cluster system for inputting a job.

Figure 3:
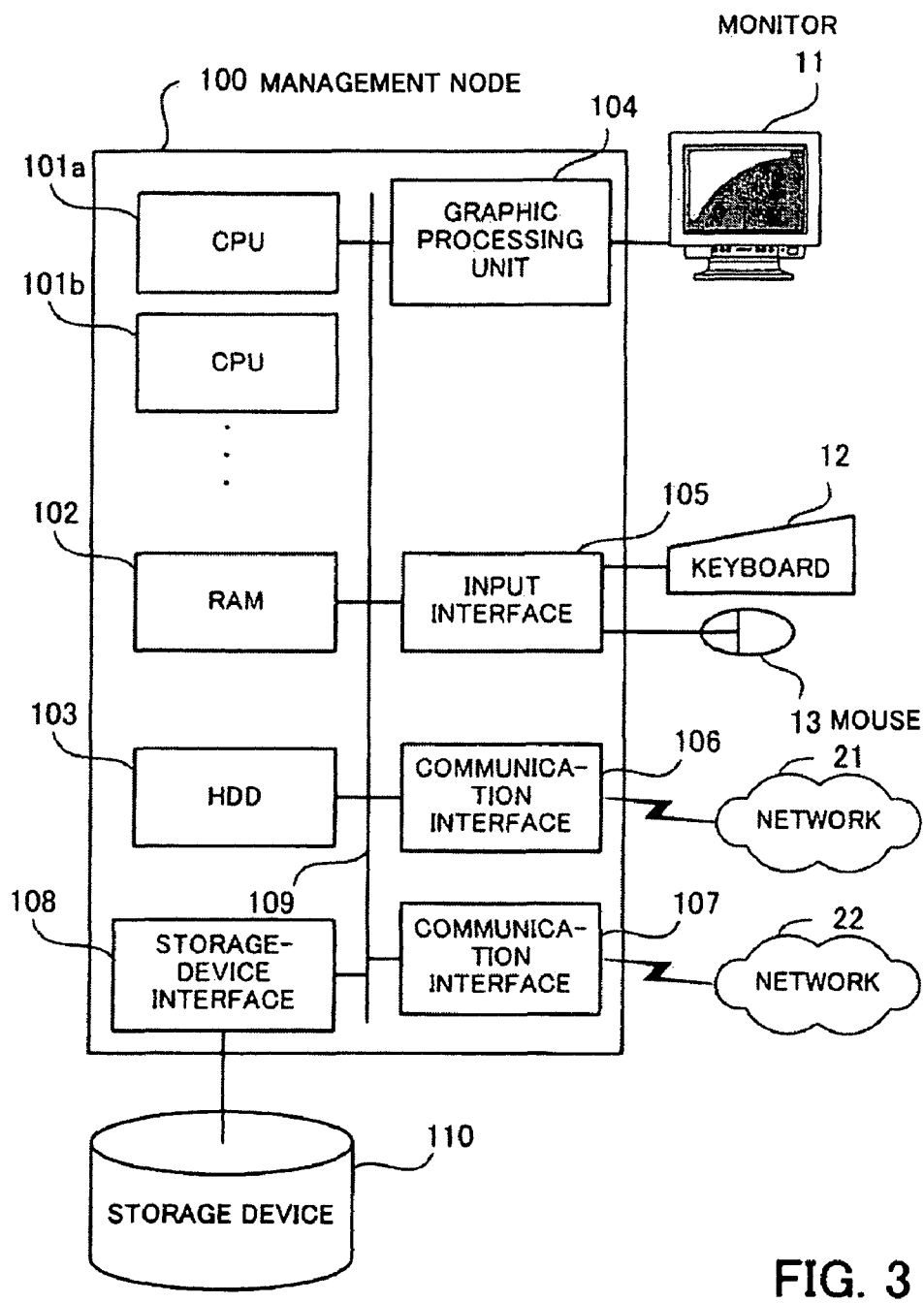
FIG. 3 is a diagram illustrating an exemplary hardware construction of a management node according to the first embodiment.

The plurality of calculation nodes 200, 300, 400, 500, and 600 are connected with each other through a network 21, and are also connected with the management node 100. Each of the calculation nodes 200, 300, 400, 500, and 600 executes a job when the job is assigned to the calculation node by the management node 100. For example, each of the management node 100 and the calculation nodes 200, 300, 400, 500, and 600 is a multiprocessor computer.
2.2 Hardware Construction FIG. 3 is a diagram illustrating an exemplary hardware construction of the management node 100 according to the first embodiment. The management node 100 is controlled by a plurality of CPUs (central processing units) 101a, 101b, . . . , to which a RAM (random access memory) 102, an HDD (hard disk drive) 103, a graphic processing device 104, an input interface 105, communication interfaces 106 and 107, and a storage-device interface 108 are connected through a bus 109. The RAM 102 is used as a main memory, and temporarily stores at least portions of an OS (operating system) program and application programs which are executed by the CPUs 101a, 101b, . . . , as well as various types of data necessary for processing by the CPUs 101a, 101b, . . . . The HDD 103 stores the OS program and the application programs. A monitor 11 is connected to the graphic processing device 104, which makes the monitor 11 display an image on a screen in accordance with an instruction from the CPUs 101a, 101b, . . . . A keyboard 12 and a mouse 13 are connected to the input interface 105, which transmits signals sent from the keyboard 12 and the mouse 13, to the CPUs 101a, 101b, . . . through the bus 109. The communication interface 106 is connected to the network 21, and exchanges data with the calculation nodes through the network 21. The communication interface 107 is connected to the network 22, and exchanges data with the job input device 30 through the network 22. The storage-device interface 108 is a communication interface used for writing data in the storage device 110 and reading data from the storage device 110.

By using the above hardware construction, it is possible to realize the functions of the management node 100 according to the first embodiment which are necessary for managing jobs. In addition, each of the calculation nodes 200, 300, 400, 500, and 600 and the job input device 30 can also be realized by using a similar hardware construction.
2.3 Functions of Cluster System FIG. 4 is a block diagram illustrating functions which the cluster system according to the first embodiment has.

Figure 4:
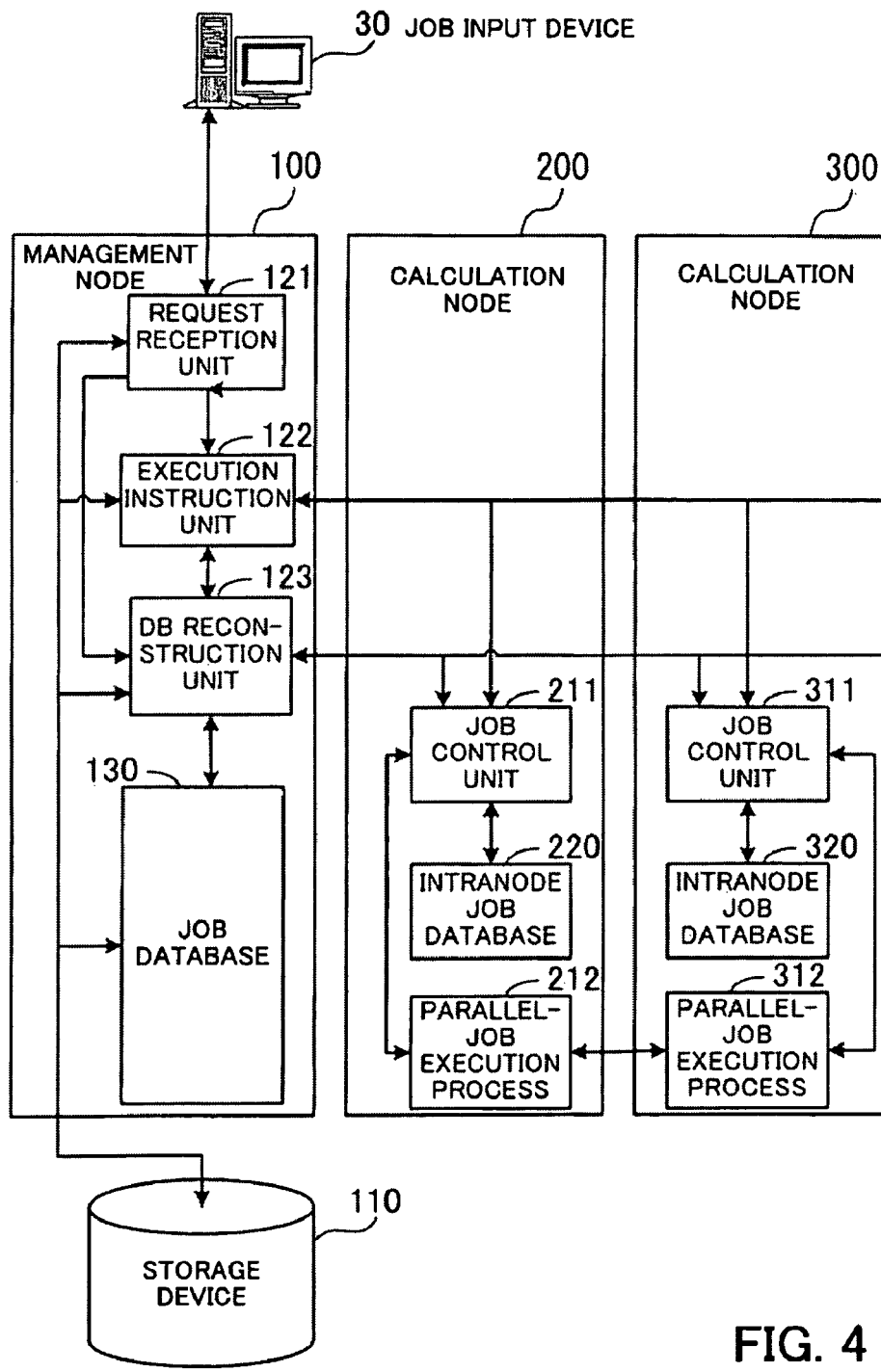
FIG. 4 is a block diagram illustrating functions which the cluster system according to the first embodiment has.

As illustrated in FIG. 4, the management node 100 comprises a request reception unit 121, an execution instruction unit 122, a DB reconstruction unit 123, and a job DB 130.

The request reception unit 121 receives a request for execution of a job (job-execution request) from the job input device 30. The job-execution request contains an indication of a program which should be used in execution of the job and parameters to be passed to the program. The request reception unit 121 passes the received job-execution request to the execution instruction unit 122, and stores job-input information indicating details of the job-execution request in the job DB 130 and the storage device 110.

The execution instruction unit 122 has a list of the calculation nodes 200, 300, 400, 500, and 600 which are in operation, and assigns the job to one or more of the calculation nodes 200, 300, 400, 500, and 600 according to the job-execution request. The execution instruction unit 122 outputs to the one or more calculation nodes a job-execution instruction corresponding to the job-execution request received from the request reception unit 121.

The job-execution request contains information indicating whether the job to be executed (requested job) is a parallel job or a sequential job. In the case where the requested job is the parallel job, the job-execution request contains the number of parallel operations (i.e., the number of calculation nodes necessary for the execution), and the execution instruction unit 122 determines more than one calculation node corresponding to the number of parallel operations, to be calculation nodes which should execute the parallel job (i.e., job-assigned calculation nodes for the parallel job). In the case where the requested job is the sequential job, the execution instruction unit 122 determines one of the calculation nodes to be a calculation node which should execute the sequential job (i.e., a job-assigned calculation node for the sequential job). Thereafter, the execution instruction unit 122 outputs a job-execution instruction to the one or more job-assigned calculation node determined as above.

When the execution instruction unit 122 outputs a job-execution instruction for a parallel job, the execution instruction unit 122 designates one of the job-assigned calculation nodes as a job master node, and the other of the job-assigned calculation nodes as one or more job slave nodes. When the execution instruction unit 122 sends the job-execution instruction to the job master node, the execution instruction unit 122 passes to the job master node execution-resource information for all the job-assigned calculation nodes. The execution-resource information is information on resources to be used in execution of the job, and the resources include, for example, CPUs to be used and the memory capacity. When the execution instruction unit 122 sends the job-execution instruction to each of the one or more job slave nodes, the execution instruction unit 122 passes to the job slave node execution-resource information for only the job slave node.

In addition, the execution instruction unit 122 stores in the storage device 110 job-assignment information indicating one or more calculation nodes to which the job-execution instruction corresponding to the job-execution request is sent. Further, when the execution instruction unit 122 outputs the job-execution instruction to the one or more calculation nodes, the execution instruction unit 122 stores the job-assignment information and the corresponding execution-resource information in the job DB 130.

Furthermore, when the management node 100 is restarted, the execution instruction unit 122 reconstructs the list of the calculation nodes which are in operation. Specifically, the execution instruction unit 122 sends a request for incorporation of a node (node-incorporation instruction) to all the calculation nodes 200, 300, 400, 500, and 600 through the network 21, for example, by broadcasting. When one or more of the calculation nodes return a response to the node-incorporation instruction, the execution instruction unit 122 recognizes that the one or more of the calculation nodes are in operation. Then, the execution instruction unit 122 produces a list of the one or more calculation nodes in operation.

Moreover, the execution instruction unit 122 receives a request from the calculation nodes 200, 300, 400, 500, and 600, and performs processing in response to the request. In addition, when execution of the job in the calculation nodes 200, 300, 400, 500, and 600 is completed, the execution instruction unit 122 receives a result of the execution, and sends the result through the request reception unit 121 to the job input device 30, which outputs the corresponding job-execution request. At this time, the execution instruction unit 122 removes job data corresponding to the completed job from the information stored in the storage device 110, and the job information for the completed job from the information stored in the job DB 130.

When the information contained in the job DB 130 is lost, the DB reconstruction unit 123 reconstructs the job DB 130. Specifically, when the management node 100 is restarted, the DB reconstruction unit 123 acquires from the storage device 110 the job-input information and the job-assignment information, and then acquires the execution-resource information from one or more calculation nodes each executing a sequential job and/or one or more job master nodes each executing a parallel job (out of the calculation nodes in operation). Subsequently, the DB reconstruction unit 123 stores the execution-resource information in the job DB 130.

The calculation node 200 comprises a job control unit 211 and an intranode job DB 220. The job control unit 211 starts a parallel-job execution process 212 in response to the job-execution instruction received from the execution instruction unit 122. Specifically, the program, parameters, and execution resources necessary for execution of the job are designated in the job-execution instruction.

The job control unit 211 instructs the OS (operating system) to execute the designated program. At this time, the job control unit 211 also instructs to the OS to use the resources designated by the job-execution instruction. In response to the instructions, the OS creates a process on a designated CPU, and makes the process execute the program for the job. In the case where the designated program is prepared for a parallel job, the started process becomes the parallel-job execution process 212. On the other hand, in the case where the designated program is prepared for a sequential job, the started process executes the sequential job.

In addition, the job control unit 211 stores in the intranode job DB 220 the execution-resource information designated by the job-execution instruction. In the case where the calculation node 200 operates as the job master node, the job control unit 211 also stores in the intranode job DB 220 the execution-resource information for the one or more job slave nodes.

In the case where execution of a job is completed, the job control unit 211 passes the result of the execution of the job to the execution instruction unit 122. At this time, the job control unit 211 removes the execution-resource information for the completed job from the intranode job DB 220.

When the job control unit 211 receives the node-incorporation instruction from the management node 100, the job control unit 211 returns node information to the management node 100. The node information includes an identifier for uniquely identifying the calculation node 200 within the cluster system and information on the implemented resources (for example, indicating the number of CPUs and the memory capacity).

Further, when the job control unit 211 receives from the management node 100 an instruction to send execution-resource information, the job control unit 211 determines whether the job control unit 211 is operating as a job master node for a parallel job or operating as a calculation node for a sequential job. In the case where the job control unit 211 is operating as a job master node for a parallel job, the job control unit 211 sends to the management node 100 all the execution-resource information stored in the intranode job DB 220. In the case where the job control unit 211 is operating as a calculation node for a sequential job, the job control unit 211 sends to the management node 100 the execution-resource information for the sequential job.

The intranode job DB 220 stores the execution-resource information for the job which is executed by the calculation node 200. For example, part of the storage area of the main memory (RAM) of the calculation node 200 is used for the intranode job DB 220.

Similar to the calculation node 200, the calculation node 300 also comprises a job control unit 311 and an intranode job DB 320. When the calculation node 300 receives a job-execution instruction for a parallel job, a parallel-job execution process 312 is started. Each element constituting the calculation node 300 has the same function as the similarly denoted element of the calculation node 200.

In the case where the calculation node 200 and the calculation node 300 receive a job-execution instruction based on a job-execution request, the parallel-job execution process 212 in the calculation node 200 and the parallel-job execution process 312 in the calculation node 300 perform processing in cooperation with each other. For example, a result of the operation of the parallel-job execution process 312 is passed to the parallel-job execution process 212, and the parallel-job execution process 212 performs another operation by using the result received from the parallel-job execution process 312.

Although not shown, the other calculation nodes 400, 500, and 600 have similar functions to the calculation node 200 and the calculation node 300.

2.4 Details of Job DB

Figure 5:
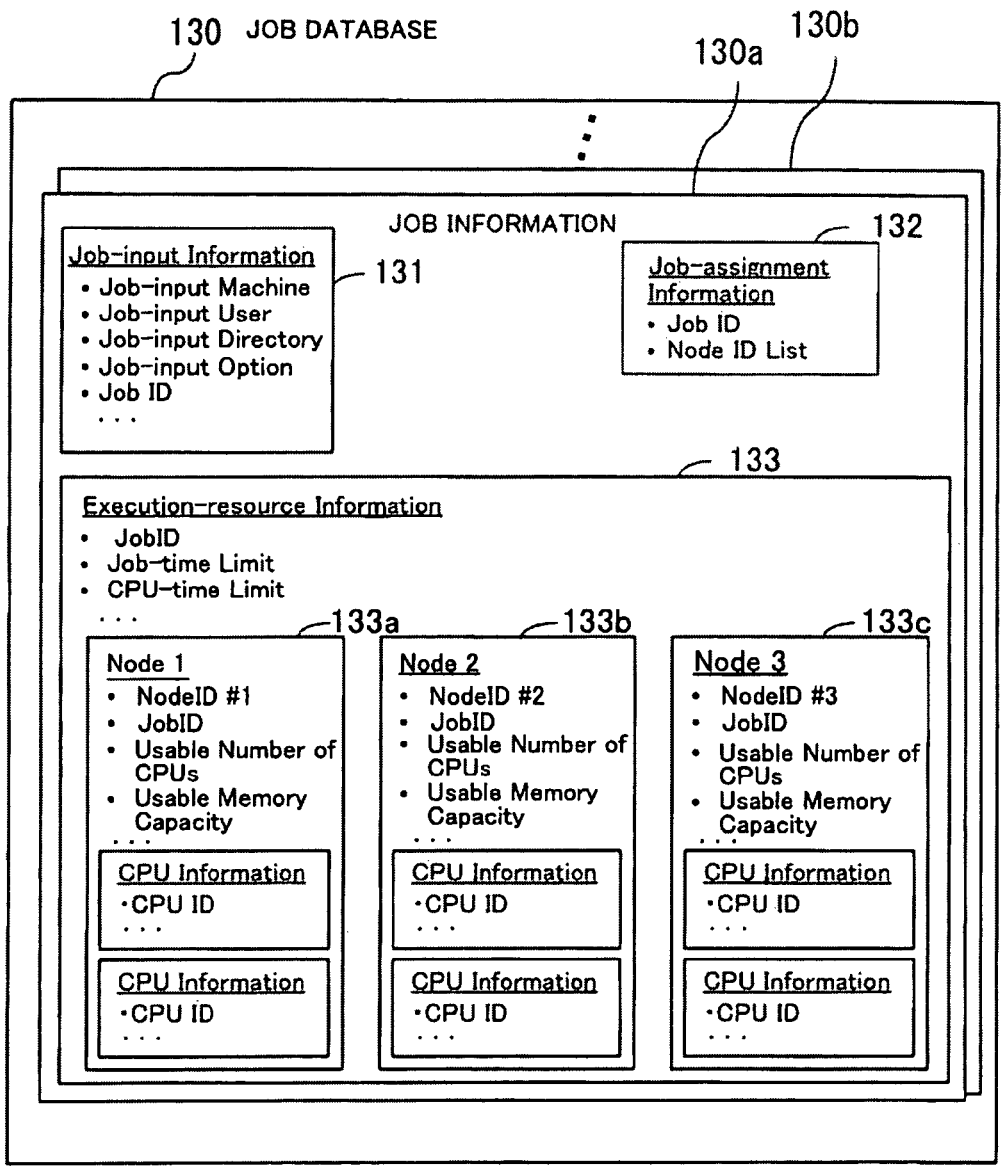
FIG. 5 is a diagram illustrating an exemplary data structure of a job database.

FIG. 5 is a diagram illustrating an exemplary data structure of the job database 130.

As illustrated in FIG. 5, the job DB 130 contains job-information sets 130*a*, 130*b*, . . . for respective jobs inputted into the cluster system. The job-information set 130*a* contains a job-input information set 131, a job-assignment information set 132, and an execution-resource information set 133.

The job-input information set 131 indicates details of a job designated by each job-execution request. For example, the job-input information set 131 contains the information items of "Job-input Machine," "Job-input User," "Job-input Directory," "Job-input Option," "Job ID," and the like.

The information item "Job-input Machine" indicates an identifier for uniquely identifying a device which outputs each job-execution request. Therefore, it is possible to identify the device to which the result of execution of each job is to be sent, by referring to the information item "Job-input Machine." In the example illustrated in FIG. 4, the device to which the result of execution of each job is to be sent is the job input device 30. The information item "Job-input User" indicates information for uniquely identifying each job inputted into the cluster system. The information item "Job-input Directory" indicates a location (directory) in which the result of execution of each job is to be stored. The information item "Job ID" indicates an identifier for uniquely identifying each job inputted into the cluster system. The identifier of "job ID" is assigned to each job by the request reception unit 121 when a job-execution request for the job is inputted into the cluster system.

The job-assignment information set 132 is information produced by the execution instruction unit 122 when the management node 100 sends a job-execution instruction to one or more job-assigned calculation nodes. The job-assignment information set 132 contains the information items of "Job ID," "Node ID List," and the like. The information item "Job ID" indicates an identifier for each job, and identical to the information item "Job ID" in the job-input information set 131. The information item "Node ID List" is a list of one or more identifiers (node IDs) of one or more calculation nodes to which the job-execution instruction is sent. In the case where the job is a parallel job, a plurality of node IDs are set in the list, and one of the pluralities of node IDs is accompanied with a flag indicating that the corresponding node is the job master node. In the case where the job is a sequential job, only a single node ID is set in the list.

The execution-resource information set 133 is information produced by the execution instruction unit 122 when the management node 100 sends a job-execution instruction to one or more job-assigned calculation nodes. The execution-resource information set 133 contains the information items of "Job ID," "Job-time Limit," "CPU-time Limit," and resource-information sets 133a, 133b, and 133c for respective job-assigned calculation nodes.

The information item "Job ID" in the execution-resource information set 133 is identical to the information item "Job ID" in the job-input information set 131. The information item "Job-time Limit" indicates the limit value of the time taken by execution of the job. In the case where the execution of the job is not yet completed when the time indicated in the information item "Job-time Limit" elapses since the start of the execution, the execution instruction unit 122 forces termination of the execution of the job. The information item "CPU-time Limit" indicates the limit value of the CPU occupation time which is allowed for the execution of the job. When the sum of the CPU occupation times by the execution of the job in the entire one or more job-assigned calculation node exceeds the time indicated in the information item "CPU-time Limit," the execution instruction unit 122 forces termination of the execution of the job.

Each of the resource-information sets 133a, 133b, and 133c contains the information items of "Node ID," "Job ID," "Usable Number of CPUs," "Usable Memory Capacity," and the like. In addition, each of the resource-information sets 133a, 133b, and 133c also contains CPU information sets on the respective CPUs in the corresponding node.

The information item "Node ID" indicates an identifier for each job-assigned calculation node. The information item "Job ID" in each of the resource-information sets 133a, 133b, and 133c is identical to the information item "Job ID" in the job-input information set 131.

The information item "Usable Number of CPUs" indicates the number of CPUs which can be used in the job-assigned calculation node corresponding to each node ID. Although not shown in FIG. 5, each of the resource-information sets 133a, 133b, and 133c further contains the number of CPUs mounted in the job-assigned calculation node corresponding to each node ID, the number of CPUs currently used, the number of CPUs reserved for execution of the job, and the like.

The information item "Usable Memory Capacity" indicates the storage capacity of the main memory (RAM) which can be used in the job-assigned calculation node corresponding to each node ID. Although not shown in FIG. 5, each of the resource-information sets 133a, 133b, and 133c further contains the total capacity of the main memory (RAM) mounted in the corresponding job-assigned calculation node, the capacity of the main memory used in execution of the job, the capacity of the main memory reserved for execution of the job, and the like.

Each of the CPU information sets contains information such as a CPU ID, which is an identifier of one of the CPUs in the corresponding job-assigned calculation node. Although not shown in FIG. 5, each of the CPU information sets contains a flag indicating whether or not the corresponding CPU is used.

Each of the job-information sets 130a, 130b, ... is removed from the job DB 130 by the execution instruction unit 122 when execution of the corresponding job is completed.

As explained above, the job DB 130 contains information necessary for management of each job in the cluster system, and part of the information contained in the job DB 130 is stored in the storage device 110, which is realized in the hard disk drive.

2.5 Data Structure in Storage Device

Figure 6:
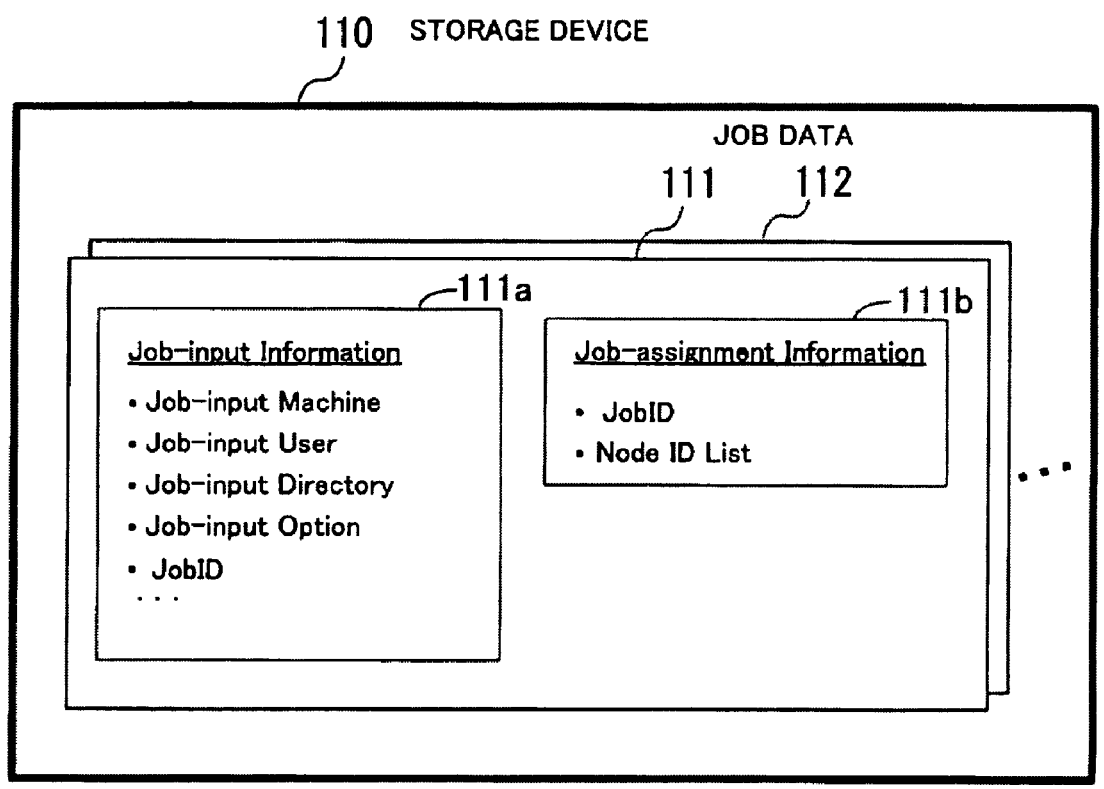
FIG. 6 is a diagram illustrating an exemplary data structure of a storage device.

FIG. 6 is a diagram illustrating an exemplary data structure of the storage device 110. The storage device 110 stores job-data sets 111, 112, 113, ... for respective jobs inputted into the cluster system (i.e., respective jobs designated by job-execution requests received by the cluster system).

For example, the job-data set 111 contains a job-input information set 111a and a job-assignment information set 111b. The job-input information set 111a is identical to the job-input information set 131 in the job DB 130, and the job-assignment information set 111b is identical to the job-assignment information set 132 in the job DB 130. Each of the other job-data sets 112, 113, ... also contains a job-input information set and a job-assignment information set.

When the job-input information set 131 is newly registered in the job DB 130, the job-input information set 111a is stored in the job-data set 111 in synchronization with the registration of the job-input information set 131. Similarly, when the job-assignment information set 132 is newly registered in the job DB 130, the job-assignment information set 111b is stored in the job-data set 111 in synchronization with the registration of the job-assignment information set 132.

2.6 Data Structures in Calculation Nodes

Exemplary data structures of the job DBs in the calculation nodes 200, 300, 400, 500, and 600 are explained below with reference to FIGS. 7 and 8. The contents of the job DBs depend on whether or not each calculation node is a job master node or a job slave node. In the following explanations, it is assumed that the calculation node 200 operates as a job master node and the calculation node 300 operates as a job slave node, and the data structures of the job DB 220 in the calculation node 200 and the job DB 320 in the calculation node 300 are indicated.

Figure 7:
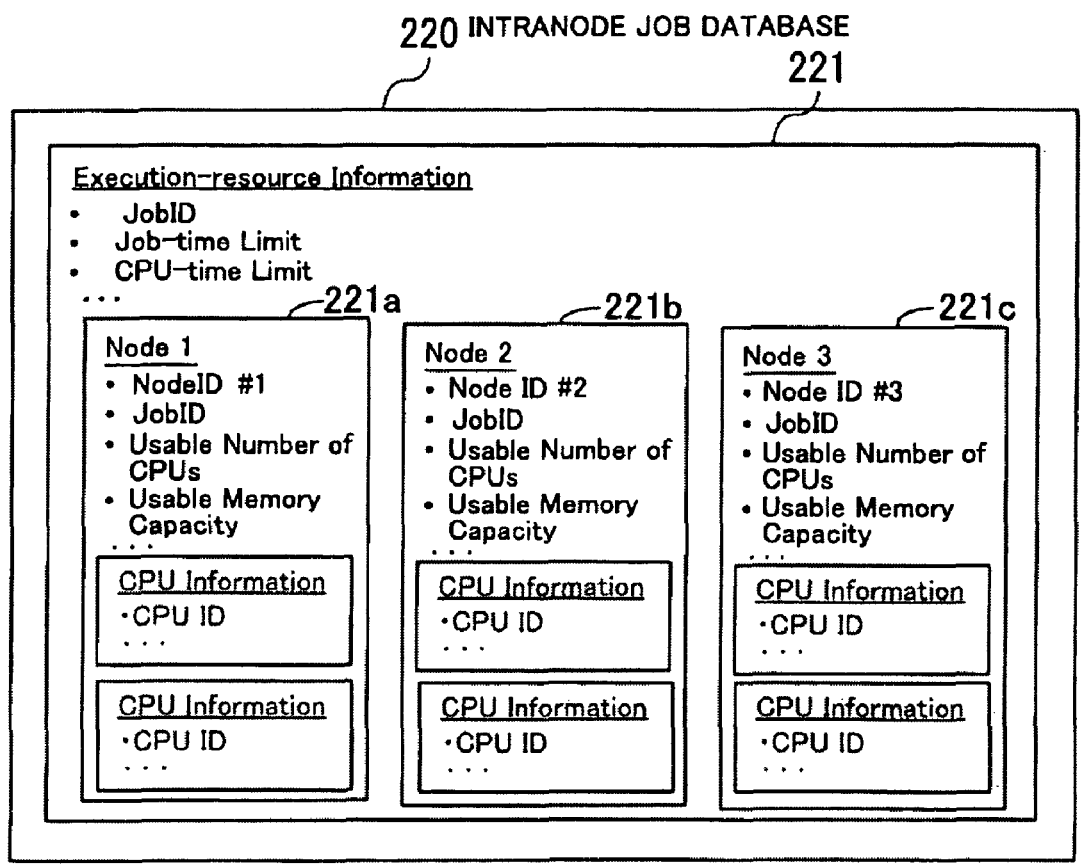
FIG. 7 is a diagram illustrating an exemplary data structure of a job database in a calculation node as a job master node.

FIG. 7 is a diagram illustrating an exemplary data structure of the job database 220 in the calculation node 200 as the job master node. The intranode job DB 220 in the job master node contains an execution-resource information set 221 for a parallel job which is executed by the job master node. The execution-resource information set 221 contains execution-resource information sets 221a, 221b, and 221c for use in external communication network of the parallel job by the respective calculation nodes to which the parallel job is assigned. The execution-resource information set 221 is identical to the execution-resource information set 133 contained in the job DB 130 in the management node 100. When the execution-resource information set 133 is newly registered in the job DB 130, the execution-resource information set 221 is stored in the intranode job DB 220 in synchronization with the registration of the execution-resource information set 133.

Figure 8:
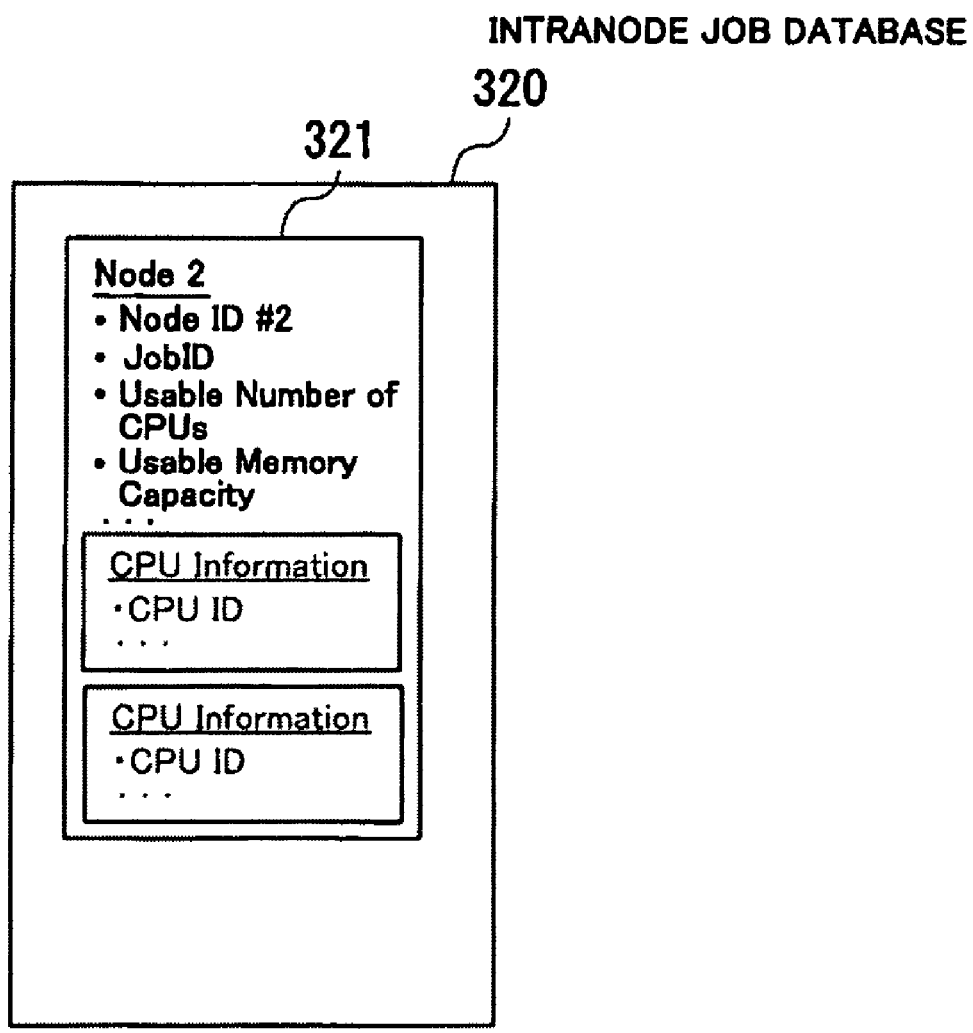
FIG. 8 is a diagram illustrating an exemplary data structure of a job database in a calculation node as a job slave node.

FIG. 8 is a diagram illustrating an exemplary data structure of the job database 320 in the calculation node 300 as a job slave node. The intranode job DB 320 in the job slave node contains an execution-resource information set 321 for use in execution of a parallel job by the job slave node. The execution-resource information set 321 is identical to one of the resource-information sets 133a, 133b, and 133c (contained in the job DB 130 in the management node 100) corresponding to the calculation node 300. When the one of the resource-information sets 133a, 133b, and 133c corresponding to the calculation node 300 is newly registered in the job DB 130, the execution-resource information set 321 is stored in the intranode job DB 320 in the calculation node 300 in synchronization with the registration of the one of the resource-information sets 133a, 133b, and 133c in the job DB 130.

2.7 Details of Processing

The cluster system having the arrangement as explained above can perform high-reliability management of jobs. Herein below, details of processing for management of jobs are explained with reference to FIGS. 9 to 25.

2.7.1 Example of Processing

Figure 9:
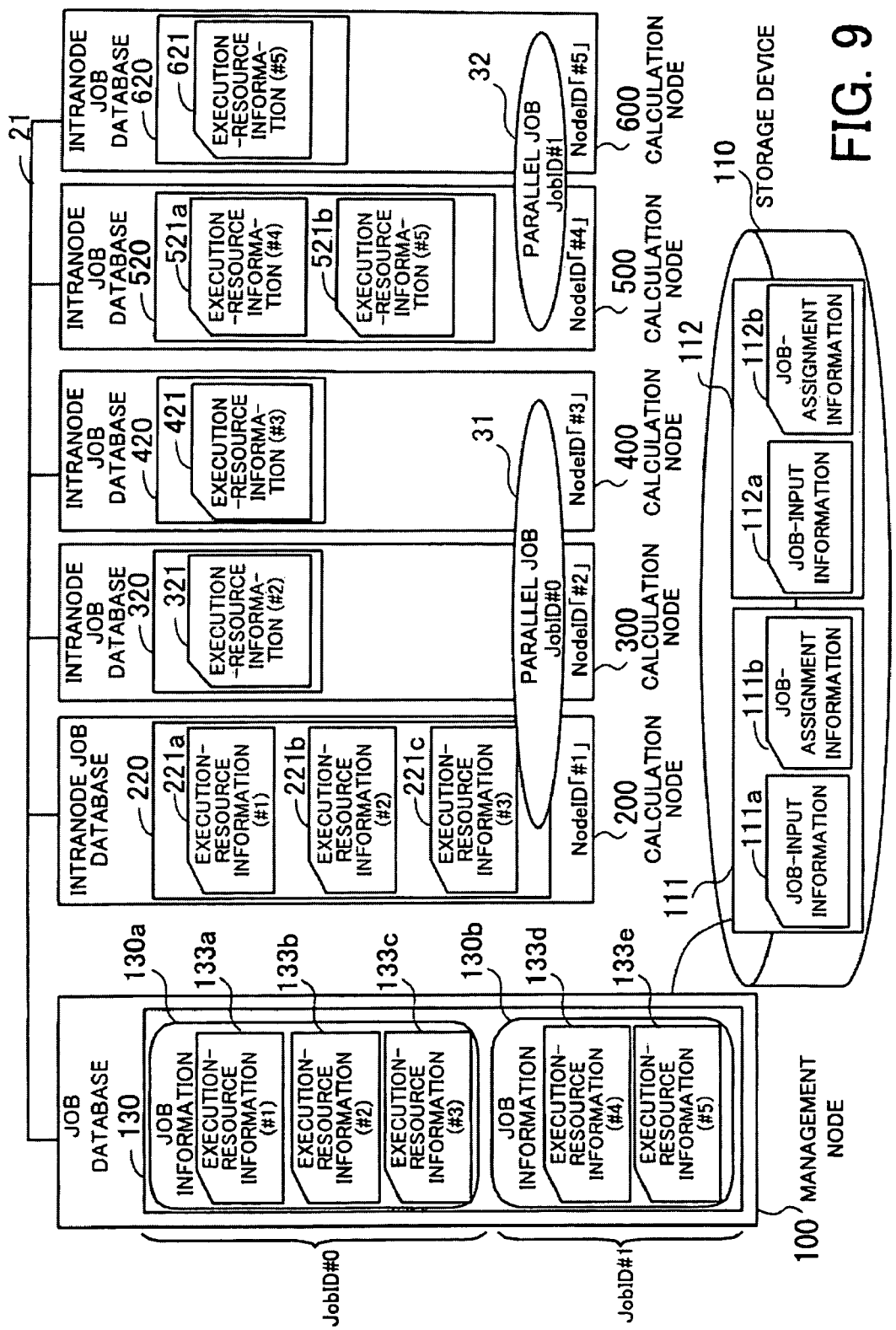
FIG. 9 is a diagram indicating an example of job execution.

FIG. 9 is a diagram indicating an example of job execution. In the example of FIG. 9, two parallel jobs 31 and 32 are executed in the cluster system.

The parallel job 31 is assigned to three calculation nodes 200, 300, and 400, so that the three calculation nodes 200, 300, and 400 execute processing for the parallel job 31 in corporation with each other. When the parallel job 31 is executed, the calculation node 200 operates as the job master node, and the calculation nodes 300 and 400 operate as job slave nodes. In the example of FIG. 9, the job ID "JobID #0" is assigned to the parallel job 31.

The parallel job 32 is assigned to two calculation nodes 500 and 600, so that the two calculation nodes 500 and 600 execute processing for the parallel job 32 in corporation with each other. When the parallel job 32 is executed, the calculation node 500 operates as the job master node, and the calculation node 600 operates as a job slave node. In the example of FIG. 9, the job ID "JobID #1" is assigned to the parallel job 32.

In the above case, the job-information set 130a corresponding to the parallel job 31 and the job-information set 130b corresponding to the parallel job 32 are stored in the job DB 130 in the management node 100. The job-information set 130a is associated with the parallel job 31 by setting the job ID "JobID #0" in the job-information set 130a. Similarly, the job-information set 130b is associated with the parallel job 32 by setting the job ID "JobID #1" in the job-information set 130b.

The job-information set 130a contains the resource-information sets 133a, 133b, and 133c respectively corresponding to the three calculation nodes 200, 300, and 400, and the job-information set 130b contains the resource-information sets 133d and 133e respectively corresponding to the two calculation nodes 500 and 600.

The intranode job DB 220 in the calculation node 200 (as the job master node for the parallel job 31) contains the execution-resource information sets 221b and 221c for the calculation nodes 300 and 400 (as the job slave nodes for the parallel job 31) as well as the execution-resource information set 221a for the calculation node 200. The node IDs of the calculation nodes 200, 300, and 400 are set in the respectively corresponding execution-resource information sets 221a, 221b, and 221c, so that it is possible to uniquely identify the correspondences between the execution-resource information sets 221a, 221b, and 221c and the calculation nodes 200, 300, and 400 by reference to the node IDs.

The intranode job DB 320 in the calculation node 300 (as the job slave node for the parallel job 31) contains the execution-resource information set 321 for the calculation node 300, and the intranode job DB 420 in the calculation node 400 (as a job slave node for the parallel job 31) contains the execution-resource information set 421 for the calculation node 400.

The intranode job DB 520 in the calculation node 500 (as the job master node for the parallel job 32) contains the execution-resource information set 521b for the calculation node 600 (as the job slave nodes for the parallel job 32) as well as the execution-resource information set 521a for the calculation node 500. The node IDs of the calculation nodes 500 and 600 are set in the respectively corresponding execution-resource information sets 521a and 521b, so that it is possible to uniquely identify the correspondences between the execution-resource information sets 521a and 521b and the calculation nodes 500 and 600 by reference to the node IDs.

The intranode job DB 620 in the calculation node 600 (as the job slave node for the parallel job 32) contains the execution-resource information set 621 for the calculation node 600.

Assume that the functions of the management node 100 fail (go down) in the above situation.

Figure 10:
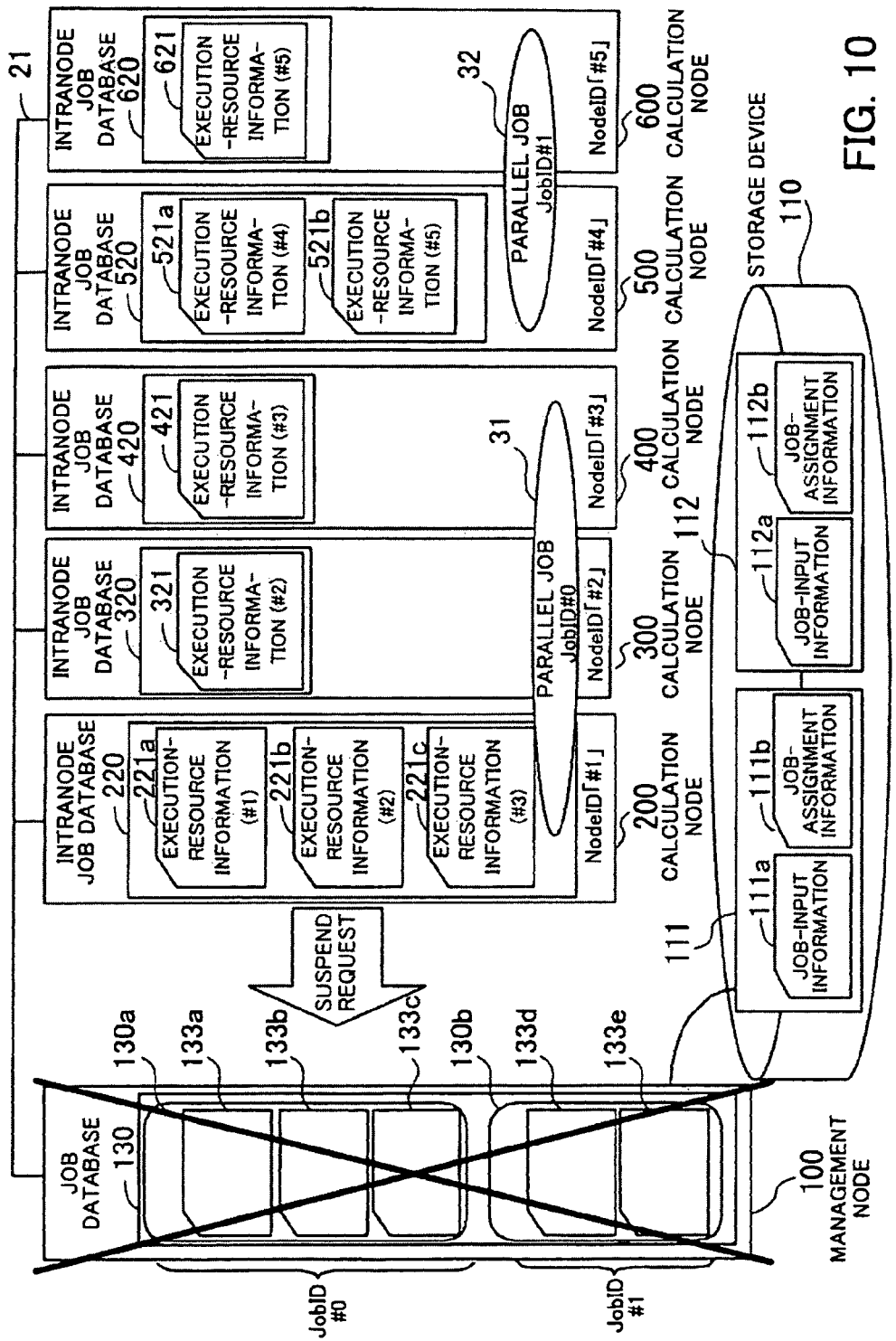
FIG. 10 is a diagram illustrating a situation in which the management node fails.

FIG. 10 is a diagram illustrating a situation in which the management node 100 fails. As illustrated in FIG. 10, when the management node 100 fails, the job-information sets 130a and 130b contained in the job DB 130 are lost. However, even in this case, the parallel jobs 31 and 32 are continuously executed in the calculation nodes 200, 300, 400, 500, and 600.

When a request which is to be outputted from the calculation nodes 200, 300, 400, 500, and 600 to the management node 100 occurs, the request is suspended until the management node 100 is restored. For example, even a completion notice (indicating completion of a job) to the management node 100 occurs, the request is suspended until the management node 100 is restored.

Figure 11:
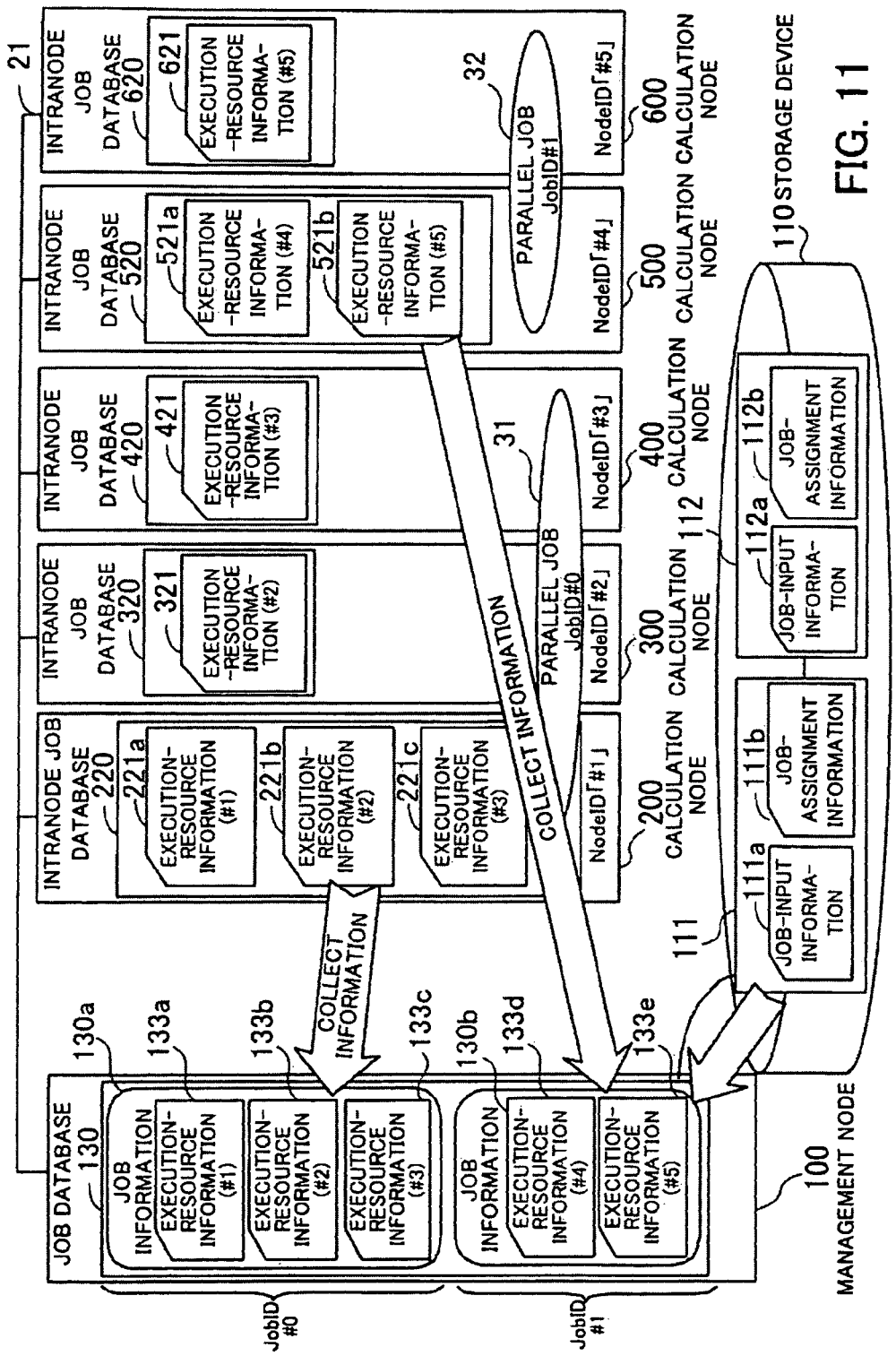
FIG. 11 is a diagram illustrating a situation after the management node is restarted.

FIG. 11 is a diagram illustrating a situation after the management node 100 is restarted. As illustrated in FIG. 11, when the management node 100 recovers from failure and is restarted, the management node 100 collects information from the storage device 110, the calculation nodes 200 and 500 (which operate as the job master nodes), and reconstructs the job DB 130.

Specifically, the management node 100 collects from the storage device 110 the job-input information sets 111a and 112a and the job-assignment information sets 111b and 112b for the parallel jobs 31 and 32. In addition, the management node 100 collects from the calculation node 200 (as the job master node for the parallel job 31) the execution-resource information sets 221a, 221b, and 221c for the calculation nodes 200, 300, and 400 (which execute the parallel job 31). Further, the management node 100 collects from the calculation node 500 (as the job master node for the parallel job 32) the execution-resource information sets 521a and 521b for the calculation nodes 500 and 600 (which execute the parallel job 32).

The management node 100 sorts the collected information into portions corresponding to the respective jobs by reference to the job IDs, and reconstructs the job-information sets 130a and 130b. Even when the management node 100 fails, each of the parallel jobs 31 and 32 is continuously executed until the management node 100 is restarted, and the job-information sets 130a and 130b are reconstructed.

2.7.2 Sequence of Execution

Next, a sequence of processing according to the first embodiment is explained in detail.

Figure 12:
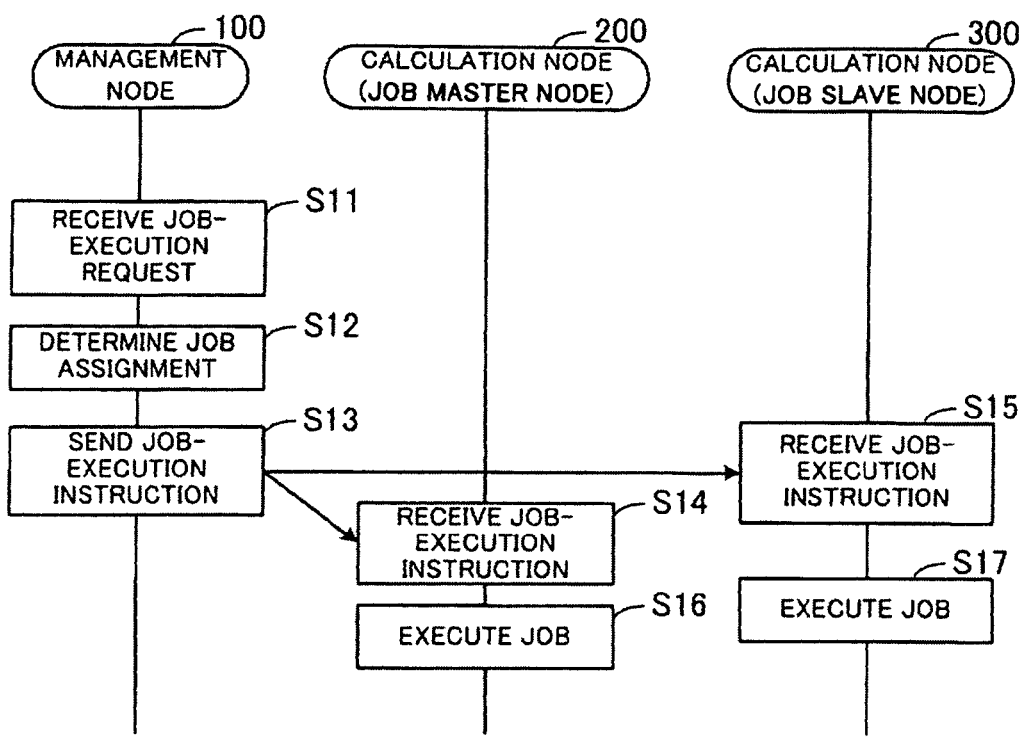
FIG. 12 is a sequence diagram indicating a sequence of processing performed before a parallel job is executed.

FIG. 12 is a sequence diagram indicating a sequence of processing performed before a parallel job is executed. The processing indicated in FIG. 12 is explained below step by step. In the following explanations, it is assumed that the management node 100 makes two nodes 200 and 300 execute a parallel job in response to a job-execution request for the parallel job.

<Step S11> The request reception unit 121 in the management node 100 receives a job-execution request from the job input device 30, and then passes the job-execution request to the execution instruction unit 122. In addition, the request reception unit 121 produces in the job DB 130 a job-information set 130a corresponding to the job-execution request. Then, the request reception unit 121 produces a job-input information set 131 on the basis of the job-execution request, and stores the job-input information set 131 in the job-information set 130a in the job DB 130. Further, the request reception unit 121 also stores the job-input information set 131 in the form of a file in the storage device 110.

<Step S12> The execution instruction unit 122 determines one or more calculation nodes to which the job requested by the job-execution request is to be assigned. Specifically, the execution instruction unit 122 waits until one or more calculation nodes corresponding to the number necessary for execution of the job become idle (not busy with execution of a job), and determines to assign the job to the one or more idle calculation nodes, which are hereinafter referred to as job-assigned calculation nodes. Until the necessary number of calculation nodes becomes idle, the management node 100 is in a wait state (in which a job-execution instruction is queued in an execution-wait queue).

In addition, the execution instruction unit 122 produces an execution-resource information set 133, and stores the execution-resource information set 133 in the job DB 130. The execution-resource information set 133 designates resources for use in execution of the job. For example, the execution-resource information set 133 includes the CPU IDs of CPUs to be used.

<Step S13> The execution instruction unit 122 determines the calculation node 200 as a job master node, and sends the job-execution instruction to the job-assigned calculation nodes determined in step S12 on the basis of the job-execution request. The job-execution instruction sent to the calculation node 200 designates the calculation node 200 as the job master node. In addition, the execution instruction unit 122 sends to the job master node the execution-resource information set 133 together with the job-execution instruction, where the execution-resource information set 133 includes execution-resource information sets for the calculation nodes 200 and 300. On the other hand, the job-execution instruction sent to the calculation node 300 designates the calculation node 300 as a job slave node, and the execution-resource information set for the calculation node 300 is sent to the calculation node 300 together with the job-execution instruction.

Further, the execution instruction unit 122 produces a job-assignment information set 132, and stores the job-assignment information set 132 in the job-information set 130a in the job DB 130. Furthermore, the execution instruction unit 122 stores the job-assignment information set 132 in the form of a file in the storage device 110. The job-assignment information set 132 indicates that the job is executed by the calculation nodes 200 and 300, and the calculation node 200 is the job master node.

<Step S14> The job-execution instruction sent to the calculation node 200 is received by the job control unit 211 in the calculation node 200. The job control unit 211 stores in the intranode job DB 220 the execution-resource information set 133 sent to the calculation node 200 together with the job-execution instruction.

<Step S15> The job-execution instruction sent to the calculation node 300 is received by the job control unit 311 in the calculation node 300. The job control unit 311 stores in the intranode job DB 320 the execution-resource information set sent to the calculation node 300 together with the job-execution instruction.

<Step S16> The job control unit 211 in the calculation node 200 starts a parallel-job execution process 212 in response to the job-execution instruction and makes the parallel-job execution process 212 execute the job.

<Step S17> The job control unit 311 in the calculation node 300 starts a parallel-job execution process 312 in response to the job-execution instruction and makes the parallel-job execution process 312 execute the job. Thereafter, the parallel-job execution process 212 in the calculation node 200 and the parallel-job execution process 312 in the calculation node 300 execute the job in corporation with each other.

When the management node 100 fails during execution of a parallel job as above, processing for restoring the management node 100 is performed.

2.7.3 Sequence for Restoration

Figure 13:
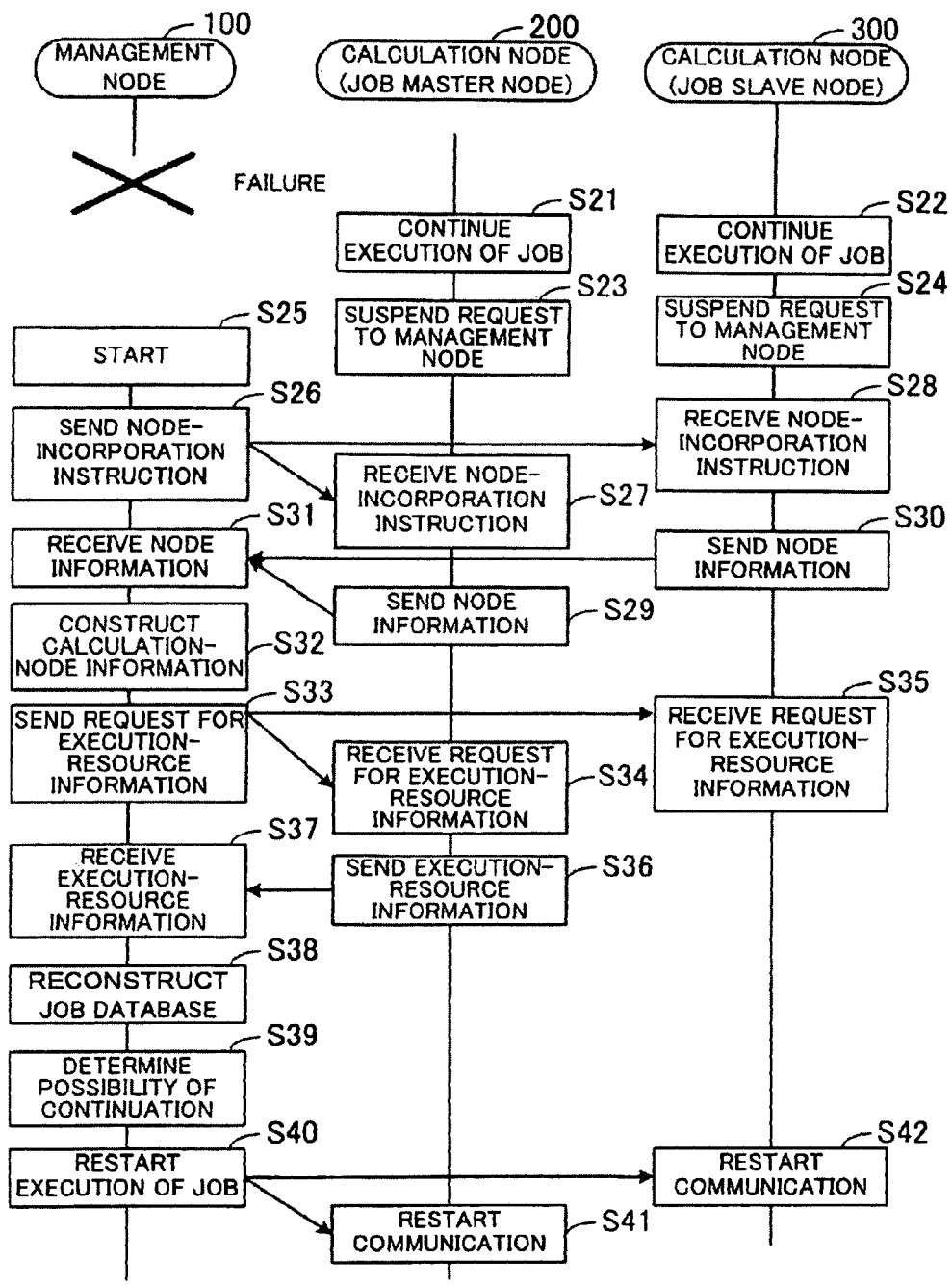
FIG. 13 is a sequence diagram indicating a sequence of processing for restoring the management node.

FIG. 13 is a sequence diagram indicating a sequence of processing for restoring the management node 100. The processing indicated in FIG. 13 is explained below step by step. In the following explanations, it is assumed that the management node 100 fails while the calculation nodes 200 and 300 execute a parallel job.

<Step S21> Even after the management node 100 fails, the parallel-job execution process 212 in the calculation node 200 continues the execution of the job.

<Step S22> Similarly, the parallel-job execution process 312 in the calculation node 300 continues the execution of the job.

<Step S23> When a request to the management node 100 occurs in the parallel-job execution process 212 in the calculation node 200, the parallel-job execution process 212 puts the request in a wait state, instead of performing error processing. While the request is in the wait state, the calculation node 200 stops counters which count the elapsing time and the CPU occupation time from the start of the execution. In some cases where a calculation service using a cluster system is provided, the charged amount depends on the elapsing time or the CPU occupation time. Since the counters counting the elapsing time and the CPU occupation time are stopped while the request to the management node 100 is in the wait state, it is possible to fairly calculate the charge for the service.

<Step S24> When a request to the management node 100 occurs in the parallel-job execution process 312 in the calculation node 300, the parallel-job execution process 312 puts the request in a wait state, instead of performing error processing. While the request is in the wait state, the calculation node 300 stops counters which count the elapsing time and the CPU occupation time from the start of the execution.

In the case where no request is necessary during the execution of the parallel-job execution processes 212 and 312, the parallel-job execution process 212 or 312 continues the execution to completion. When the execution is completed, an operation for informing of the result of the execution is put in a wait state. The result of the execution includes the time taken to complete the execution and the CPU occupation time as well as a calculation result.

<Step S25> When the cause of the failure in the management node 100 is eliminated, the management node 100 is started.

<Step S26> The execution instruction unit 122 in the management node 100 sends a node-incorporation instruction to the calculation nodes 200 and 300. The node-incorporation instruction is a message for instructing the calculation nodes 200 and 300 to operate as a calculation node constituting the cluster system.

<Step S27> The job control unit 211 in the calculation node 200 receives the node-incorporation instruction from the management node 100.

<Step S28> The job control unit 311 in the calculation node 300 receives the node-incorporation instruction from the management node 100.

<Step S29> The job control unit 211 in the calculation node 200 sends node information to the management node 100. The node information includes the node ID of the calculation node 200 and resource information on (hardware and software) resources which the calculation node 200 has.

<Step S30> The job control unit 311 in the calculation node 300 sends node information to the management node 100. The node information includes the node ID of the calculation node 300 and resource information on (hardware and software) resources which the calculation node 300 has.

<Step S31> The execution instruction unit 122 receives the node information.

<Step S32> The execution instruction unit 122 constructs calculation-node information indicating calculation nodes in operation. Specifically, the execution instruction unit 122 produces a list of the calculation nodes in operation, and manages the resource information in association with the node ID of each calculation node.

<Step S33> The DB reconstruction unit 123 sends an instruction to send execution-resource information to the calculation nodes 200 and 300.

<Step S34> The job control unit 211 in the calculation node 200 receives the instruction to send execution-resource information.

<Step S35> The job control unit 311 in the calculation node 300 receives the instruction to send execution-resource information.

<Step S36> The job control unit 211 in the calculation node 200 sends the execution-resource information to the management node 100. Specifically, the job control unit 211 acquires the execution-resource information set 221 from the intranode job DB 220. The execution-resource information set 221 includes the execution-resource information set for the calculation node 200 and the execution-resource information set for the calculation node 300 (which operates as the job slave node for the parallel job). Then, the job control unit 211 sends the execution-resource information set 221 to the management node 100.

At this time, the calculation node 300 does not send the execution-resource information, since the calculation node 300 is the job slave node. That is, the job control unit 311 in the calculation node 300 ignores the instruction to send execution-resource information sent from the management node 100. Therefore, it is possible to prevent useless data transfer in the operation for collecting the execution-resource information.

<Step S37> The DB reconstruction unit 123 in the management node 100 receives the execution-resource information sent from the calculation node 200 (as the job master node).

<Step S38> The DB reconstruction unit 123 reconstructs the job DB 130. Specifically, the DB reconstruction unit 123 acquires from the storage device 110 the job-input information set 131 and the job-assignment information set 132, and produces the job-information set for each job (which is the job-information set 130a for the parallel job in this example). Then, the DB reconstruction unit 123 registers as a part of the job-information set 130a the execution-resource information set 133 acquired from the calculation node 200.

<Step S39> The DB reconstruction unit 123 determines whether or not execution of the job can be continued. Specifically, the DB reconstruction unit 123 recognizes details of the job-execution request which has been received by the cluster system, on the basis of the job-input information set 131. In addition, the DB reconstruction unit 123 determines one or more calculation nodes to which the job is assigned, on the basis of the job-assignment information set 132. Further, the DB reconstruction unit 123 confirms, on the basis of the calculation-node information constructed in step S32, that all the job-assigned calculation nodes are in operation and the execution-resource information for the job-assigned calculation nodes has been sent from the job master node. When this confirmation is correctly made, the DB reconstruction unit 123 determines that execution of the job can be continued.

<Step S40> When the execution of the job is determined to be able to continue, the DB reconstruction unit 123 sends a notice of the restart of the execution of the job to the calculation nodes 200 and 300, which are executing the parallel job.

<Step S41> When the job control unit 211 in the calculation node 200 receives the notice of the restart of the execution of the job, the job control unit 211 restarts communication with the management node 100. Therefore, when a request to the management node 100 is in the wait state, the job control unit 211 sends the request to the management node 100. When the execution of the job is already completed, the job control unit 211 sends the result of the execution to the management node 100.

<Step S42> When the job control unit 311 in the calculation node 300 receives the notice of the restart of the execution of the job, the job control unit 311 restarts communication with the management node 100.

As described above, even when the management node 100 fails, the calculation nodes 200 and 300 can continue to execute the parallel job. Although a request to the management node 100 which occurs while the management node 100 fails is put in a wait state, it is possible to restart the processing from the sending of the request when the management node 100 is restarted. Therefore, it is unnecessary to re-execute the job from the beginning, so that the processing efficiency can be increased.

2.7.4 Processing After Double Failure

Herein below, processing which is performed after both of the management node and a calculation node fail is explained.

Figure 14:
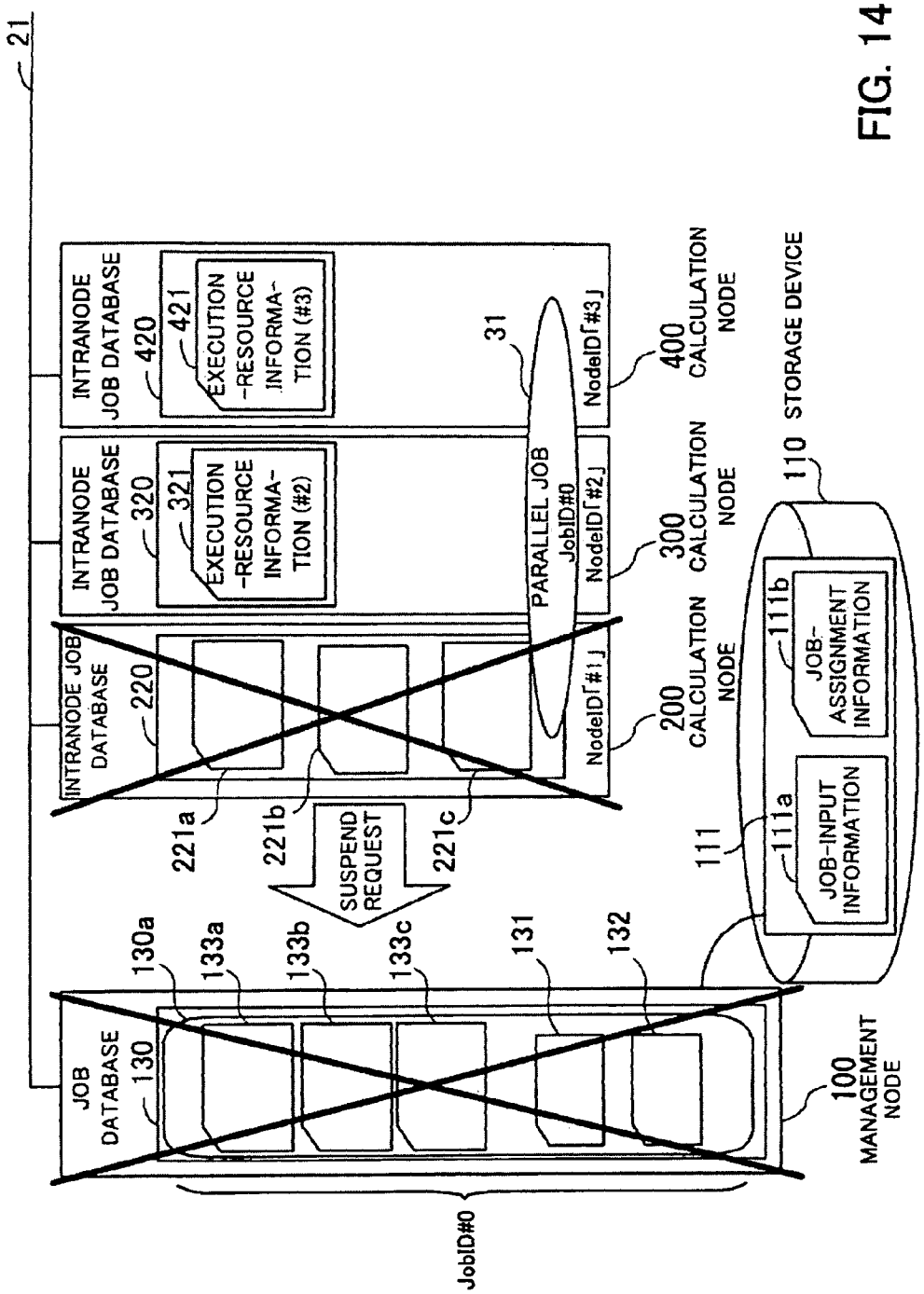
FIG. 14 is a diagram illustrating a situation in which the management node and a job master node concurrently fail.

FIG. 14 is a diagram illustrating a situation in which the management node and a job master node concurrently fail. When both of the management node 100 and the calculation node 200 (which operates as the job master node) concurrently fail as illustrated in FIG. 14, it is impossible to perform part of the processing for the parallel job 31, and continue the execution of the parallel job 31. As illustrated in FIG. 14, the job DB 130 in the management node 100 and the intranode job DB 220 in the calculation node 200 contain no data immediately after the management node 100 and the calculation node 200 (which operates as the job master node) recover from the failure and are restarted.

Figure 15:
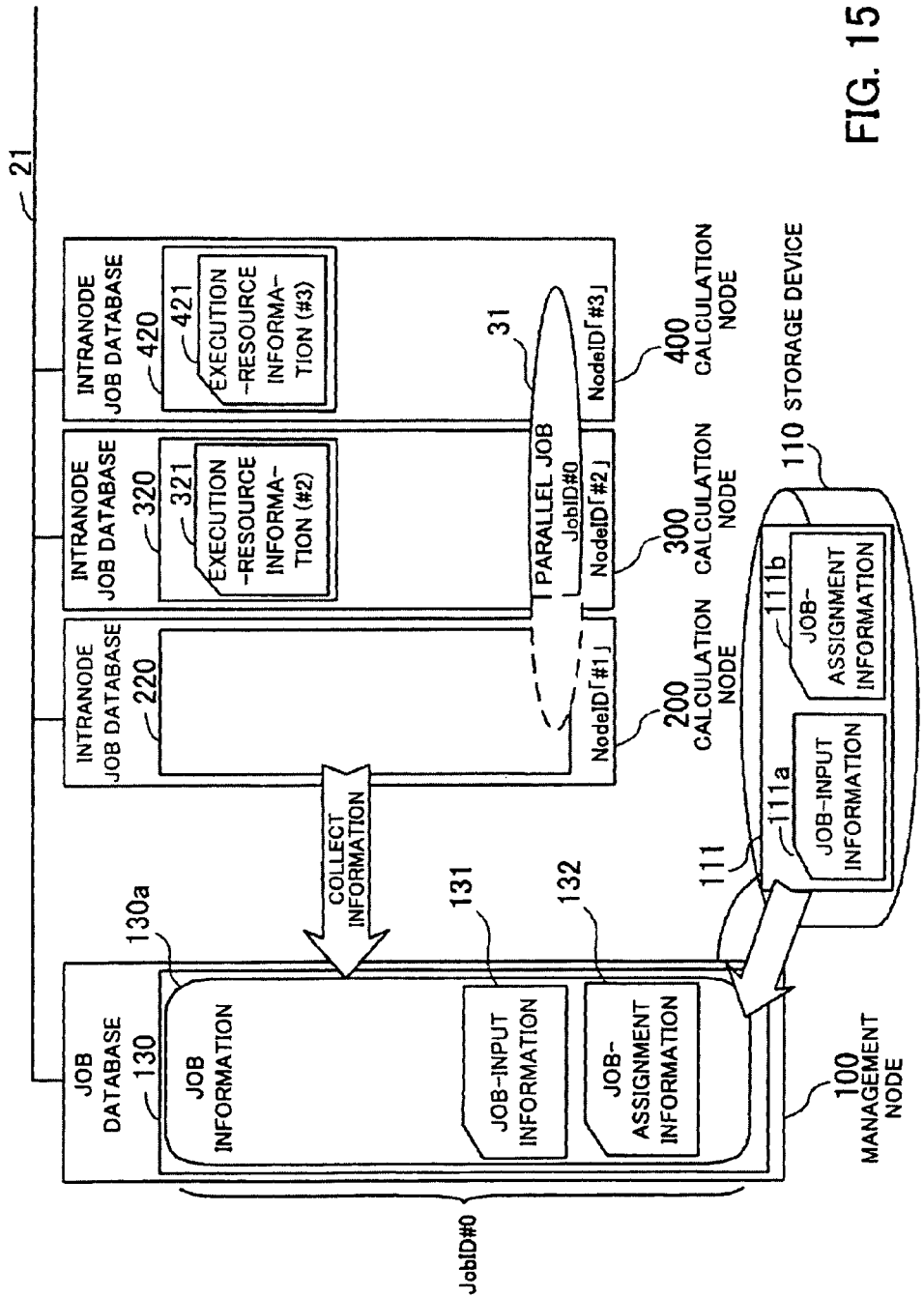
FIG. 15 is a diagram illustrating a situation after the management node and the job master node are restarted.

Therefore, the management node 100 makes an attempt to collect information from the storage device 110 and the calculation nodes 200, 300, and 400, so that the management node 100 can acquire the job-input information set 111a and the job-assignment information set 111b from the storage device 110, and reconstruct the job-input information set 131 and the job-assignment information set 132 in the job-information set 130a as illustrated in FIG. 15, which is a diagram illustrating a situation immediately after the management node and the job master node are restarted.

However, since the data in the intranode job DB 220 in the calculation node 200 (which operates as the job master node) is lost by the failure, it is impossible to acquire the execution-resource information for the parallel job 31 from the calculation node 200. Therefore, the management node 100 performs processing for cutting off the parallel job 31 (i.e., forcefully stopping execution of the parallel job).

Figure 16:
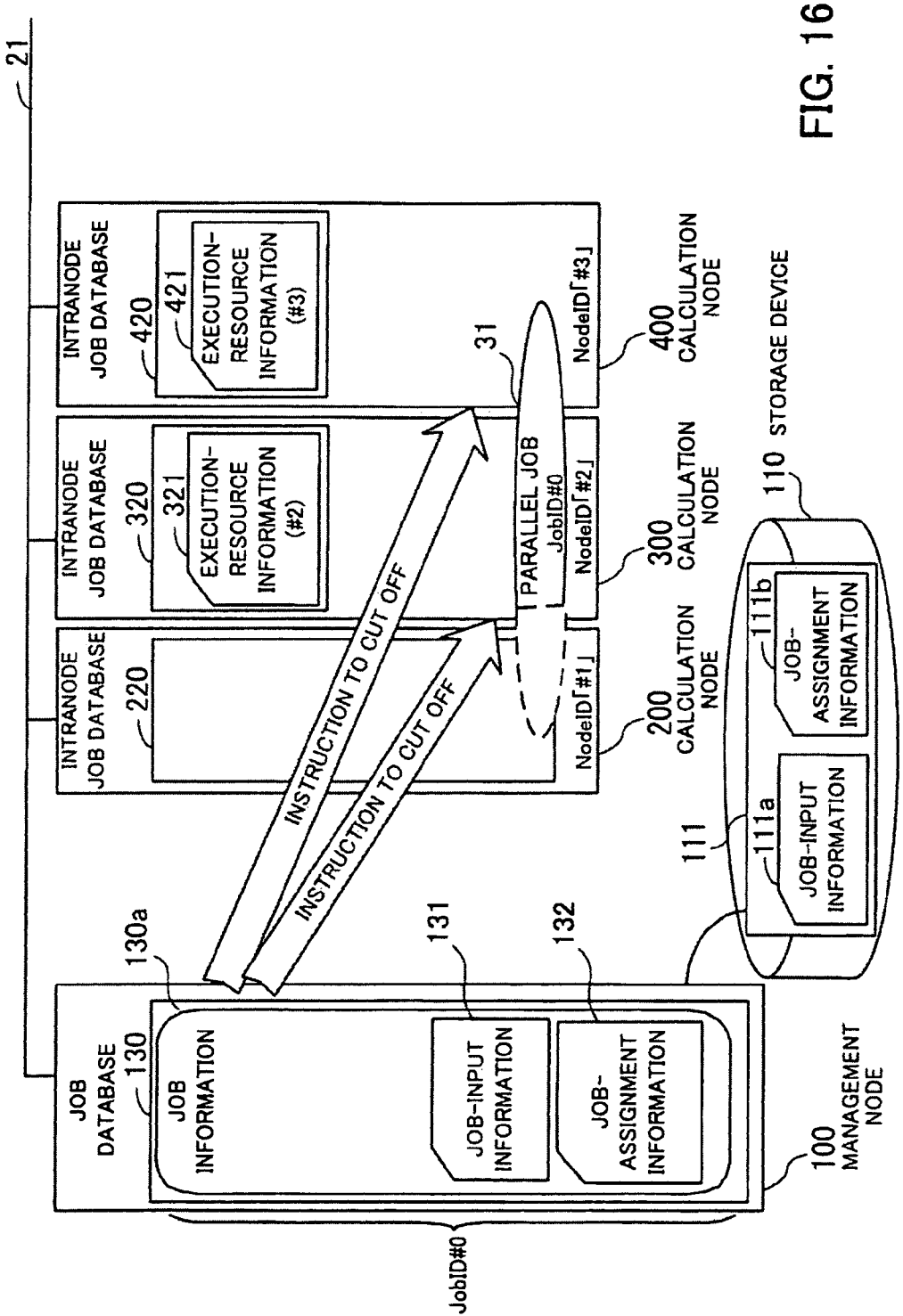
FIG. 16 is a diagram illustrating a situation in which an instruction to cut off the job is outputted after the management node and the job master node are restarted.

FIG. 16 is a diagram illustrating a situation in which an instruction to cut off the job is outputted after the management node and the job master node are restarted. The management node 100 compares the job-assignment information set 132 with the acquired execution-resource information, and recognizes that the execution of the parallel job 31 cannot be continued. Then, the management node 100 sends an instruction to cut off the parallel job 31, to the calculation nodes 300 and 400 (which operate as job slave nodes), so that the calculation nodes 300 and 400 cut off the parallel job 31 which have been executed, in response to the instruction.

Figure 17:
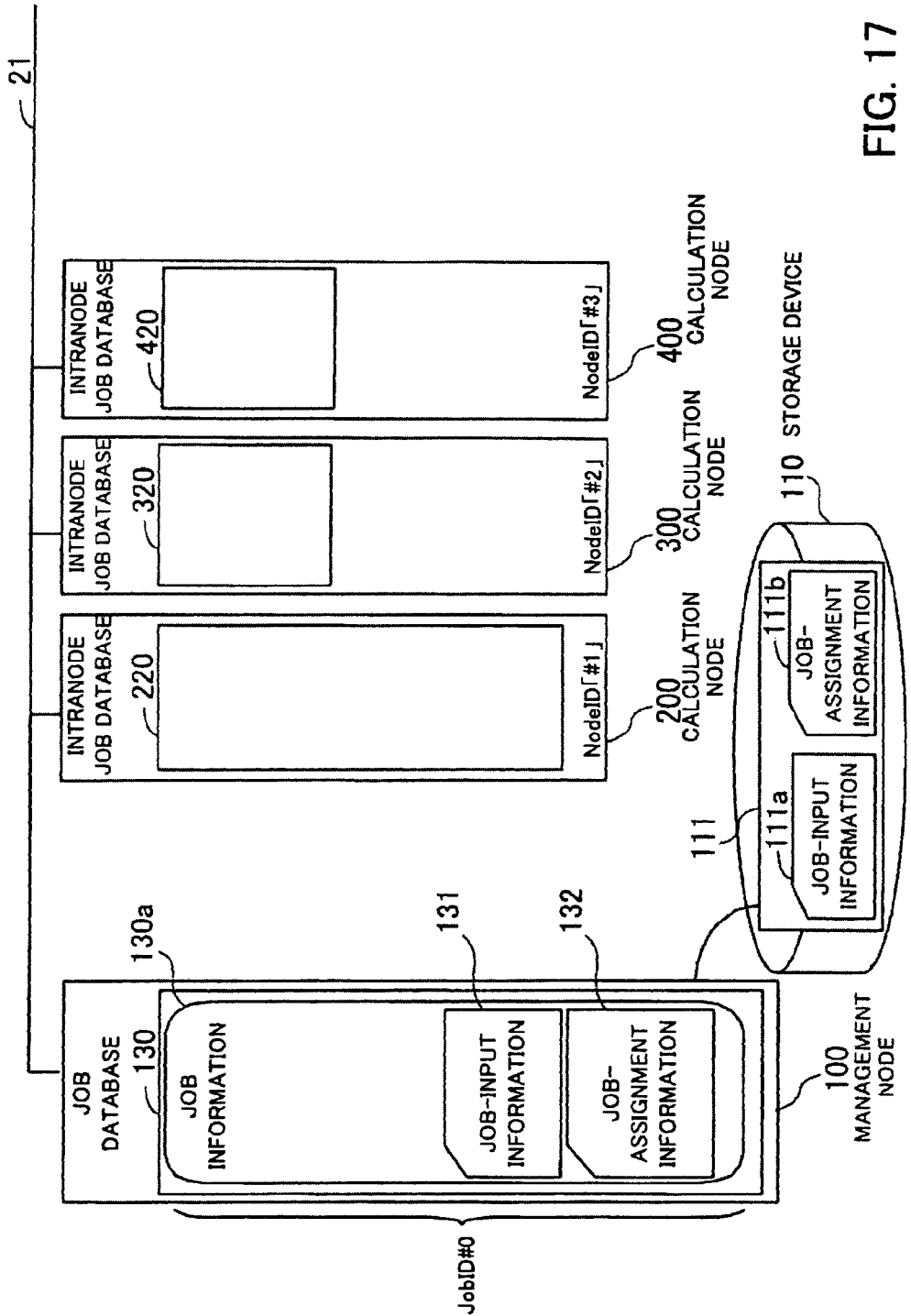
FIG. 17 is a diagram illustrating a situation after the cutoff is performed as illustrated in FIG. 16.

FIG. 17 is a diagram illustrating a situation after the cutoff is performed as illustrated in FIG. 16. As illustrated in FIG. 17, since the parallel job 31 is cut off, the processes for the parallel job 31 which have been executed in the calculation nodes 300 and 400 stop. In addition, the contents of the intranode job DB 320 in the calculation node 300 and the intranode job DB 420 in the calculation node 400 are removed. Thereafter, the management node 100 outputs an instruction to re-execute the job.

Figure 18:
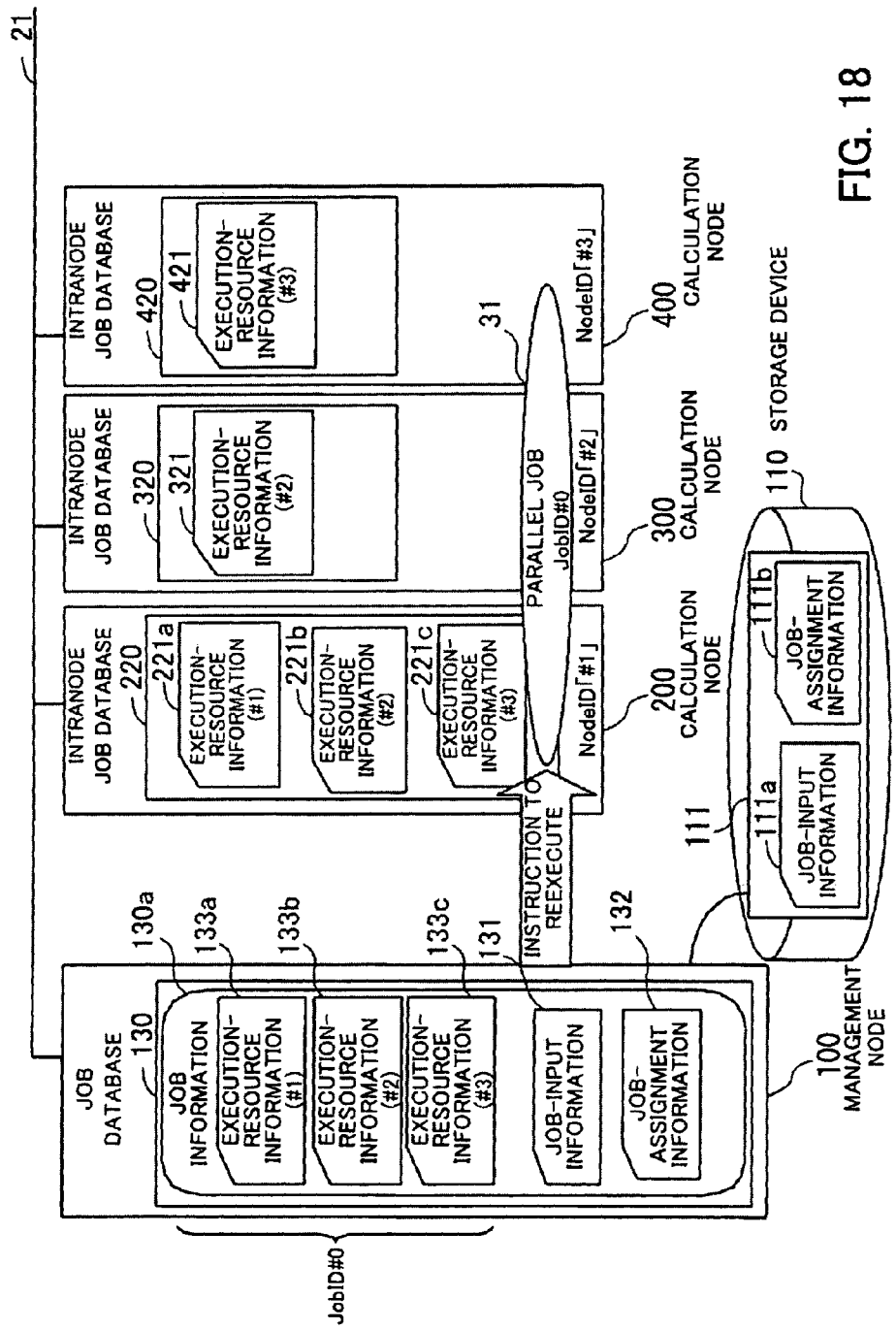
FIG. 18 is a diagram illustrating a situation in which an instruction to re-execute the parallel job is outputted after the management node and the job master node are restarted.

FIG. 18 is a diagram illustrating a situation in which an instruction to re-execute the parallel job is outputted. The management node 100 recognizes details of the job to be inputted and the calculation nodes 200, 300, and 400 to which the job is assigned, on the basis of the job-input information set 131 and the job-assignment information set 132. Then, the management node 100 reconstructs the job-information set 130a in the job DB 130, and sends an instruction to re-execute the job to the calculation nodes 200, 300, and 400. The instruction to re-execute the job contains the resource-information sets for the calculation nodes 200, 300, and 400. At this time, the resource-information sets for all the calculation nodes 200, 300, and 400 are sent to the calculation node 200 (which operates as the job master node), and the resource-information sets 321 and 421 for the calculation nodes 300 and 400 are respectively sent to the calculation nodes 300 and 400 (which operate as the job slave nodes).

The calculation nodes 200, 300, and 400 respectively reconstruct the intranode job DBs 220, 320, and 420 on the basis of the received resource-information sets, and then start execution of the parallel job 31.

As indicated above, even when the management node 100 and the calculation node 200 (which operates as the job master node) concurrently fail, the cluster system can re-execute the job by only the processing performed within the cluster system. That is, the cluster system can re-execute the job the execution of which has been requested by the job input device 30 before the failure, without losing the information on the job, although the job is re-executed from the beginning.

Figure 19:
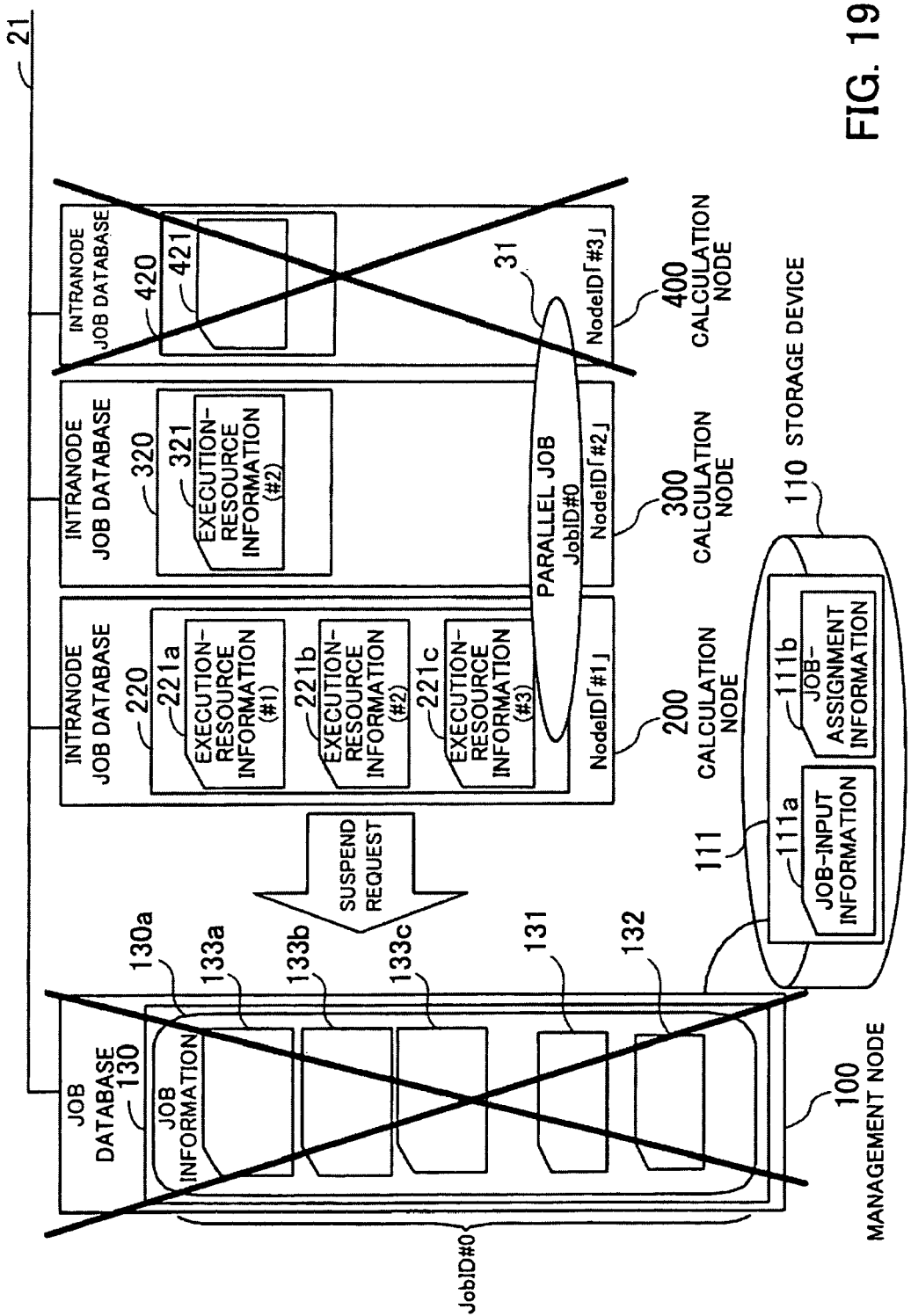
FIG. 19 is a diagram illustrating a situation in which the management node and a job slave node concurrently fail.

FIG. 19 is a diagram illustrating a situation in which the management node and a job slave node concurrently fail. As illustrated in FIG. 19, when both of the management node 100 and the calculation node 400 (which operates as the job slave node) concurrently fail, it is impossible to perform part of the processing for the parallel job 31, and continue the execution of the parallel job 31.

As illustrated in FIG. 19, the job DB 130 in the management node 100 and the intranode job DB 420 in the calculation node 400 contain no data immediately after the management node 100 and the calculation node 400 (which operates as the job slave node) recover from the failure and are restarted.

Figure 20:
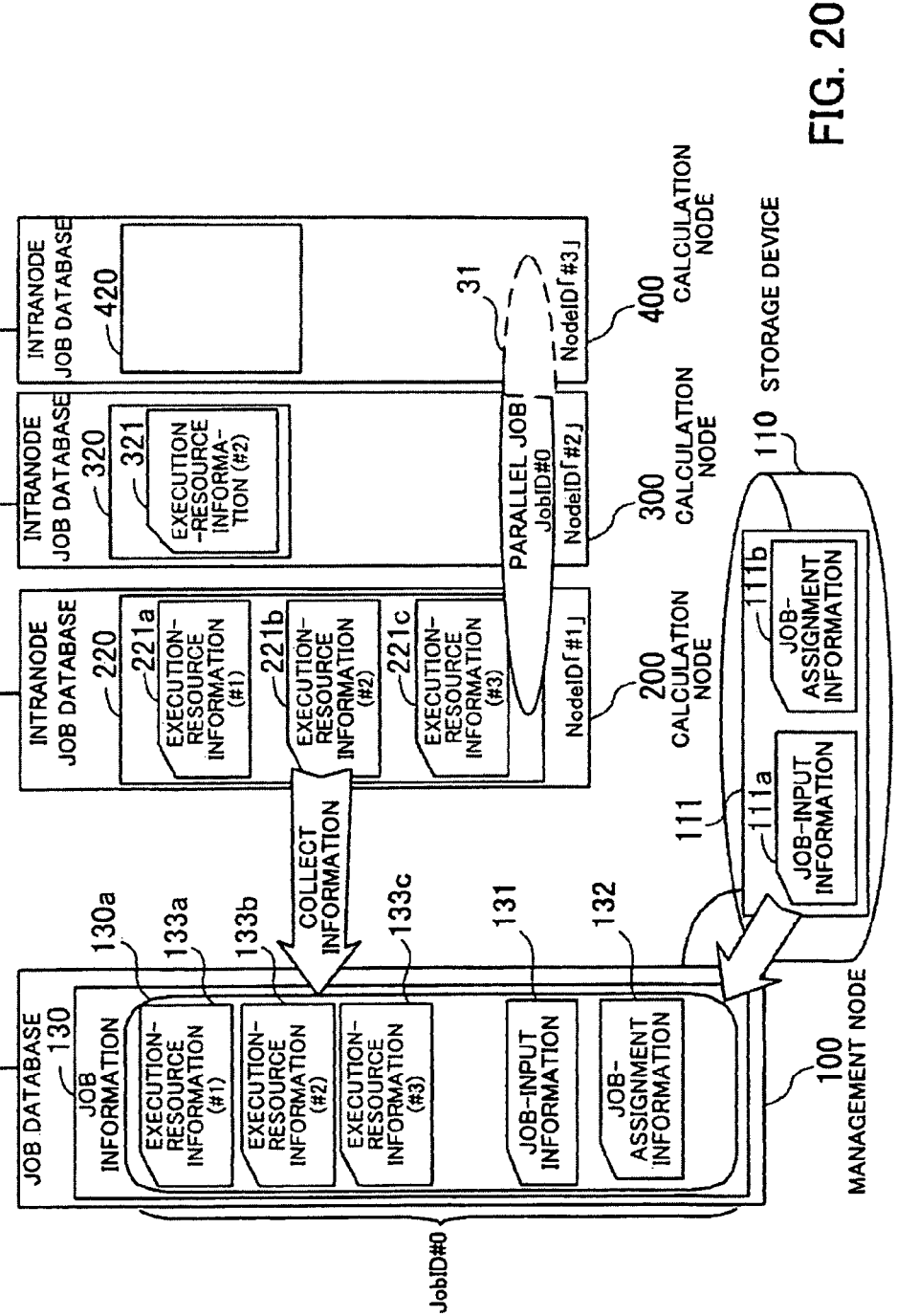
FIG. 20 is a diagram illustrating a situation after the management node and the job slave node are restarted.

Therefore, the management node 100 makes an attempt to collect information from the storage device 110 and the calculation nodes 200, 300, and 400, so that the management node 100 can acquire the job-input information set 111a and the job-assignment information set 111b from the storage device 110, and the execution-resource information from the calculation node 200. Thus, the management node 100 can reconstruct the job-information set 130a in the job DB 130 as illustrated in FIG. 20, which is a diagram illustrating a situation immediately after the management node and the job slave node are restarted.

However, since the calculation node 400 (which operates as the job slave node) is restarted, and information on the processing is lost, it is impossible to execute the parallel job 31. Therefore, the management node 100 performs processing for cutting off the parallel job 31 (i.e., forcefully stopping execution of the parallel job).

Figure 21:
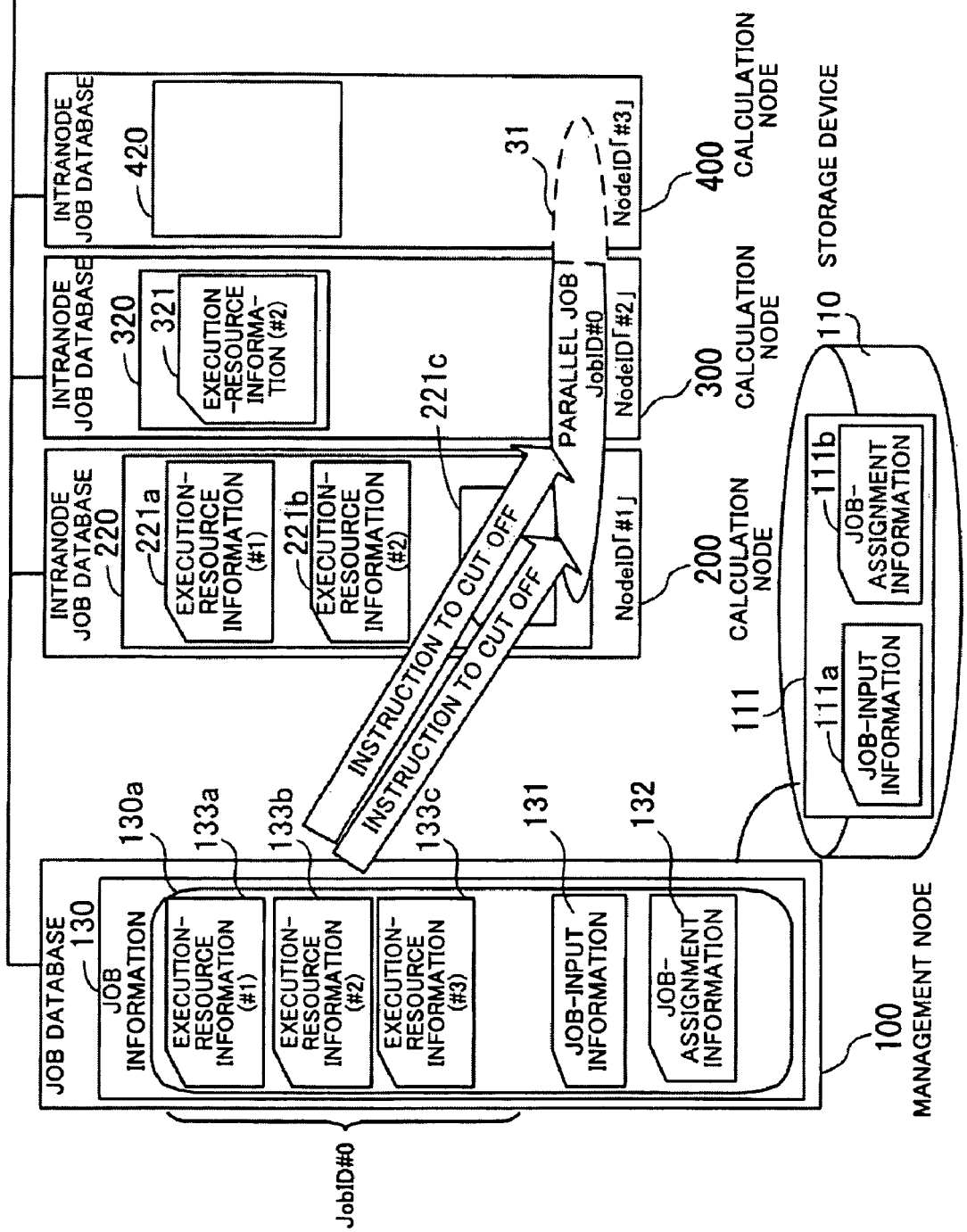
FIG. 21 is a diagram illustrating a situation in which an instruction to cut off the job is outputted after the management node and the job slave node are restarted.

FIG. 21 is a diagram illustrating a situation in which an instruction to cut off the job is outputted after the management node and the job slave node are restarted. The management node 100 checks the states of the job-assigned calculation nodes 200, 300, and 400, which are indicated in the job-assignment information set 132. Immediately after the restart, the calculation node 400 is in a non-active state. Therefore, the management node 100 recognizes that it is impossible to continue the execution of the parallel job 31, the execution of which has been requested before the failure. Thus, the management node 100 sends an instruction to cut off the parallel job 31, to the calculation nodes 200 and 300, so that the calculation nodes 200 and 300 cuts off the parallel job 31 which have been executed, in response to the instruction.

Figure 22:
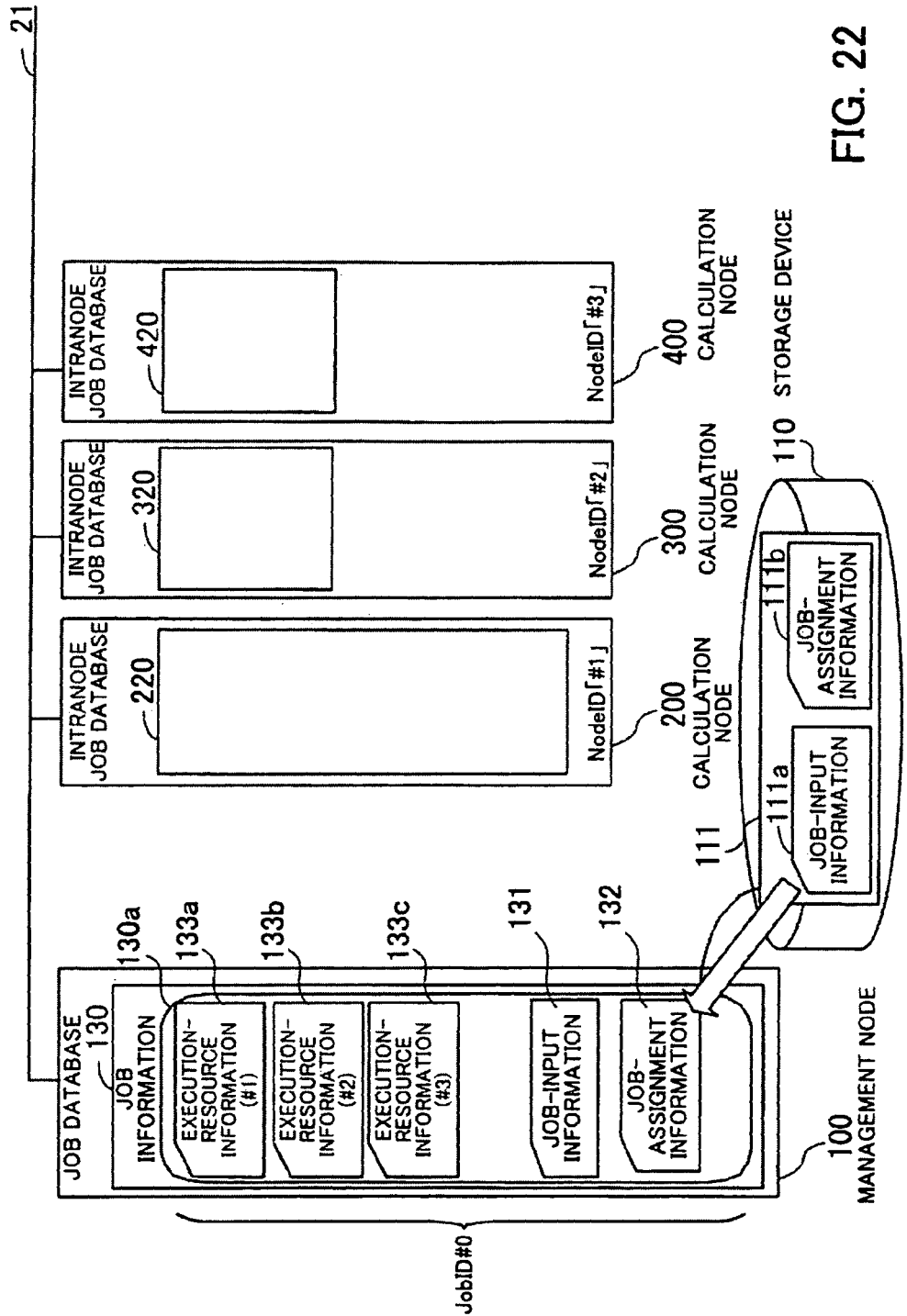
FIG. 22 is a diagram illustrating a situation after cutoff is performed as illustrated in FIG. 21.

FIG. 22 is a diagram illustrating a situation after the cutoff is performed as illustrated in FIG. 21. As illustrated in FIG. 22, the processes for the parallel job 31 which have been executed in the calculation nodes 200 and 300 stop, since the parallel job 31 is cut off. In addition, the contents of the intranode job DB 220 in the calculation node 200 and the intranode job DB 320 in the calculation node 300 are also removed. Thereafter, the management node 100 outputs an instruction to re-execute the job as illustrated in FIG. 18.

As explained above, even when both of the management node 100 and the calculation node 400 (which operate as the job slave node) concurrently fail, the cluster system can re-execute the job by only the processing performed within the cluster system.

Figure 23:
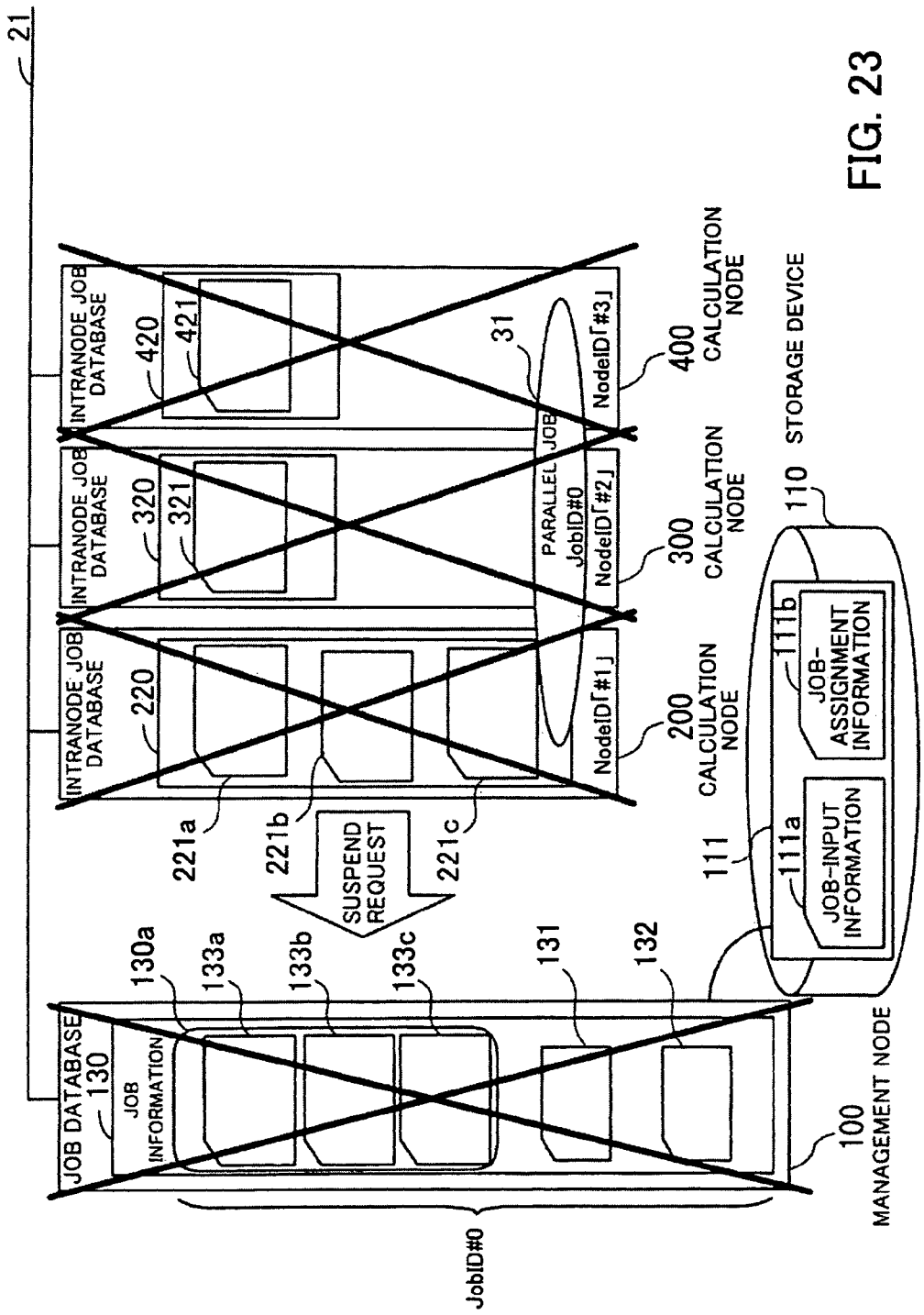
FIG. 23 is a diagram illustrating a situation in which all the nodes concurrently fail.

FIG. 23 is a diagram illustrating a situation in which all the nodes concurrently fail. When all the nodes concurrently fail as illustrated in FIG. 23, the execution-resource information, as well as the information on the parallel job 31, is lost.

Figure 24:
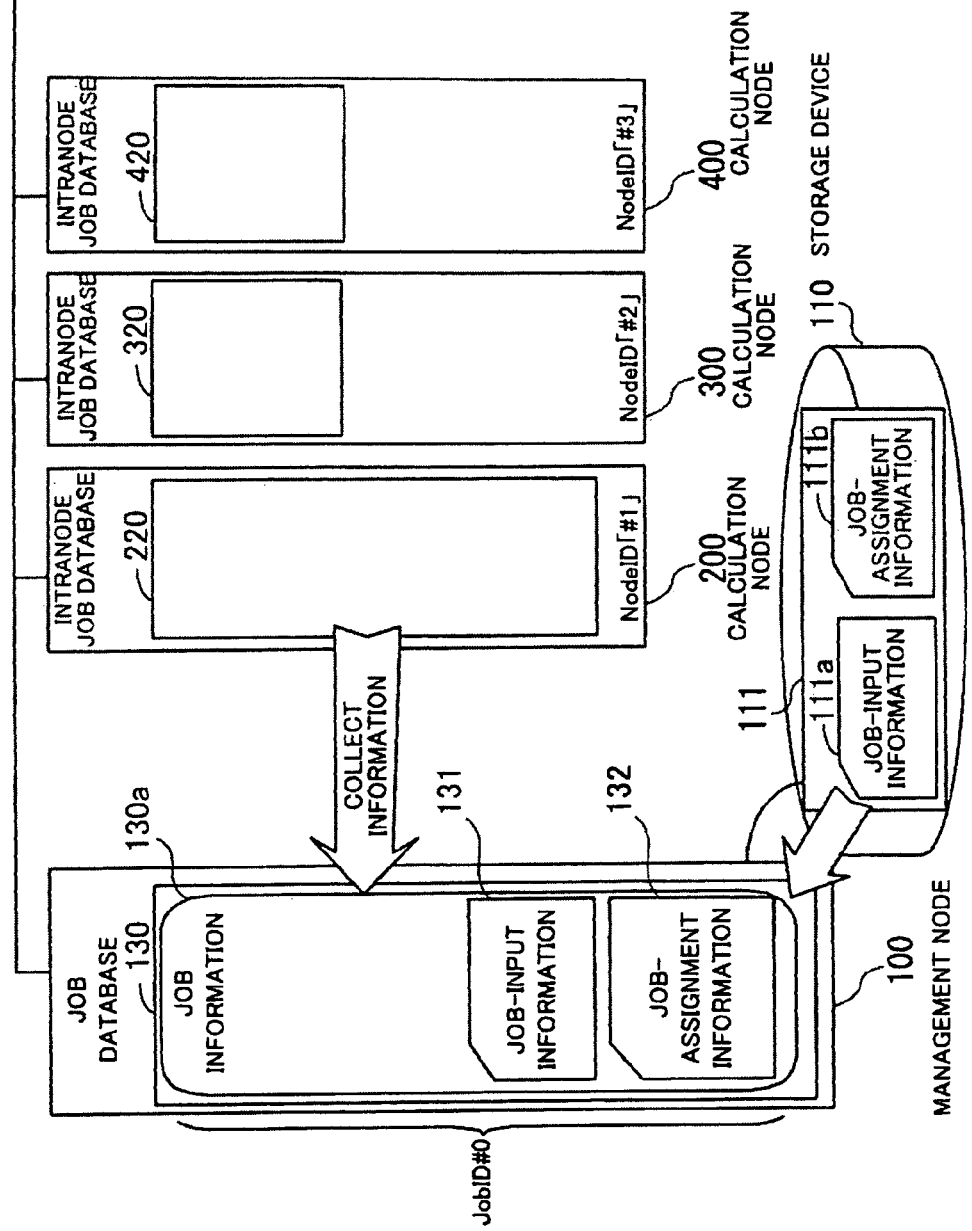
FIG. 24 is a diagram illustrating a situation after all the nodes are restarted.

FIG. 24 is a diagram illustrating a situation after all the nodes are restarted. As illustrated in FIG. 24, the job DB 130 in the management node 100 and the intranode job DBs 220, 320, and 420 in the calculation nodes 200, 300, and 400 contain no data immediately after the management node 100 and the calculation nodes 200, 300, and 400 (which operate as the job slave nodes) recover from the failure and are restarted.

Therefore, the management node 100 makes an attempt to collect information from the storage device 110 and the calculation nodes 200, 300, and 400, so that the management node 100 can acquire the job-input information set 111a and the job-assignment information set 111b from the storage device 110. Thus, the management node 100 can reconstruct the job-input information set 131 and the job-assignment information set 132 in the job-information set 130a. However, since the data in the intranode job DB 220 in the calculation node 200 (which operates as the job master node) is lost by the failure, it is impossible to acquire the execution-resource information for the parallel job 31 from the calculation node 200.

Therefore, the management node 100 checks the states of the job-assigned calculation nodes 200, 300, and 400, which are indicated in the job-assignment information set 132. Immediately after the restart, the calculation nodes 200, 300, and 400 are in a non-active state. Thus, the management node 100 recognizes that the information on the parallel job 31, the execution of which has been requested by the job input device 30 before the failure, is lost. Since information on the parallel job 31 does not exist in the cluster system, the cutoff of the parallel job 31 is unnecessary. Thus, the management node 100 outputs the instruction to re-execute the job as illustrated in FIG. 18.

Figure 25:
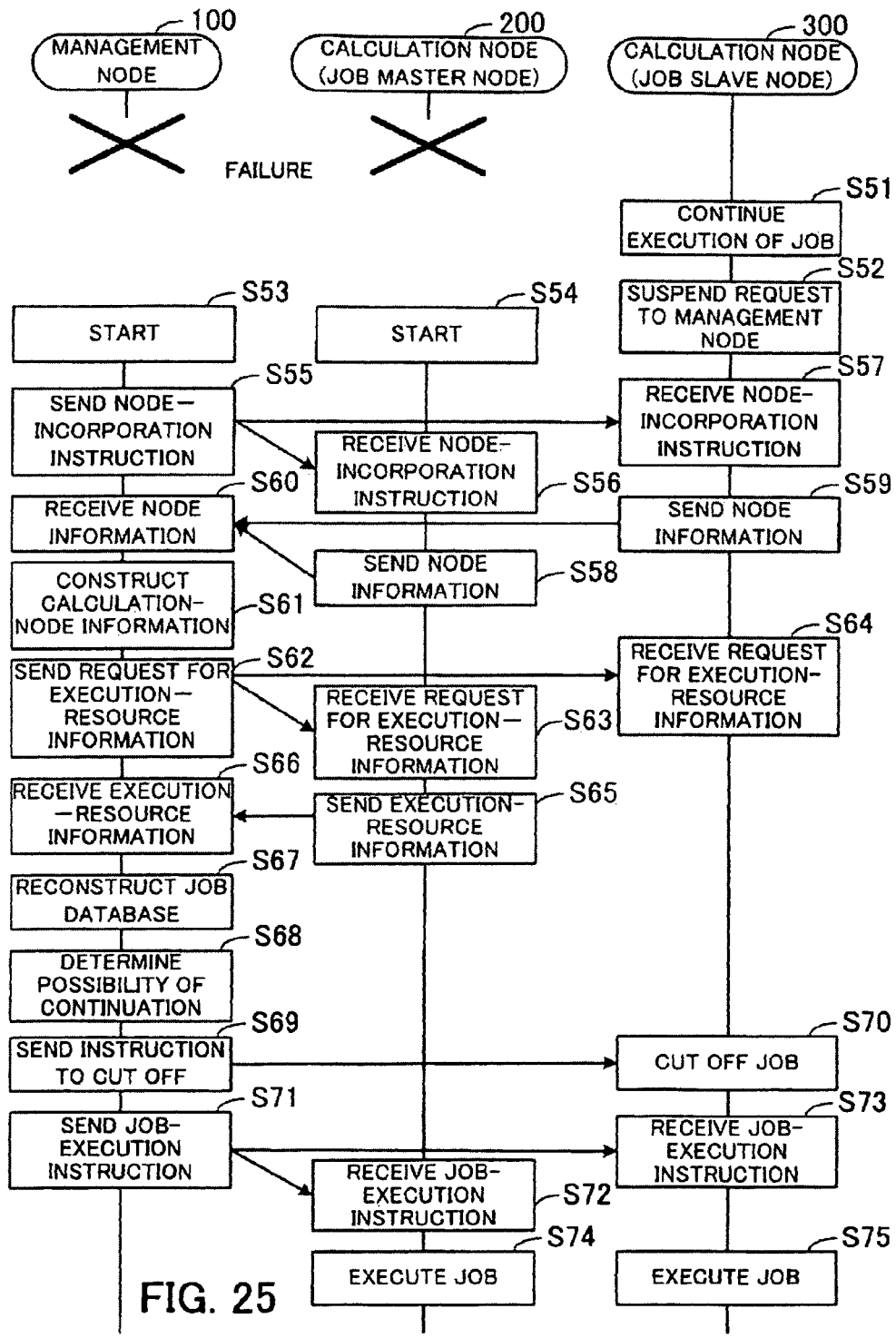
FIG. 25 is a sequence diagram indicating a sequence of processing for restoring the management node and a calculation node when the management node and the calculation node concurrently fail.

FIG. 25 is a sequence diagram indicating a sequence of processing for restoring the management node and a calculation node when the management node and the calculation node concurrently fail. The processing indicated in FIG. 25 is explained below step by step. In the following explanations, it is assumed that the management node 100 and the calculation node 200 fail while the calculation nodes 200 and 300 execute a parallel job.

<Step S51> Even after the management node 100 fails, the parallel-job execution process 312 in the calculation node 300 continues the execution of the job.

<Step S52> When a request to the management node 100 occurs in the parallel-job execution process 312 in the calculation node 300, the parallel-job execution process 312 puts the request in a wait state, instead of performing error processing.

<Step S53> When the cause of the failure in the management node 100 is eliminated, the management node 100 is started.

<Step S54> When the cause of the failure in the calculation node 200 is eliminated, the calculation node 200 is started.

<Step S55> The execution instruction unit 122 in the management node 100 sends a node-incorporation instruction to the calculation nodes 200 and 300. The node-incorporation instruction is a message for instructing the calculation nodes 200 and 300 to operate as a calculation node constituting the cluster system.

<Step S56> The job control unit 211 in the calculation node 200 receives the node-incorporation instruction from the management node 100.

<Step S57> The job control unit 311 in the calculation node 300 receives the node-incorporation instruction from the management node 100.

<Step S58> The job control unit 211 in the calculation node 200 sends node information to the management node 100. The node information includes the node ID of the calculation node 200 and resource information on (hardware and software) resources which the calculation node 200 has. Since, immediately after the restart, the calculation node 200 is in a non-active state, and does not operate as a part of the cluster system, the job control unit 211 makes the node information contain information that the calculation node 200 is non-active.

<Step S59> The job control unit 311 in the calculation node 300 sends node information to the management node 100. The node information includes the node ID of the calculation node 300 and resource information on (hardware and software) resources which the calculation node 300 has.

<Step S60> The execution instruction unit 122 receives the node information.

<Step S61> The execution instruction unit 122 constructs calculation-node information for calculation nodes in operation. Specifically, the execution instruction unit 122 produces a list of the calculation nodes in operation, and manages the resource information in association with the node ID of each calculation node.

<Step S62> The DB reconstruction unit 123 sends to the calculation nodes 200 and 300 an instruction to send execution-resource information.

<Step S63> The job control unit 211 in the calculation node 200 receives the instruction to send execution-resource information.

<Step S64> The job control unit 311 in the calculation node 300 receives the instruction to send execution-resource information.

<Step S65> The job control unit 211 in the calculation node 200 sends the execution-resource information to the management node 100. Specifically, the job control unit 211 makes an attempt to acquire the execution-resource information set 221 from the intranode job DB 220. However, since the intranode job DB 220 contains no data, the job control unit 211 sends to the management node 100 null information as the execution-resource information.

<Step S66> The DB reconstruction unit 123 in the management node 100 receives the execution-resource information (null information) sent from the calculation node 200 (which operates as the job master node).

<Step S67> The DB reconstruction unit 123 reconstructs the job DB 130. Specifically, the DB reconstruction unit 123 acquires from the storage device 110 the job-input information set 131 and the job-assignment information set 132, and produces the job-information set for each job (the job-information set 130a for the parallel job in this example). However, since the management node 100 can acquire only the null information from the calculation node 200, the management node 100 cannot reconstruct the execution-resource information.

<Step S68> The DB reconstruction unit 123 determines whether or not execution of the job can be continued. In this example, the DB reconstruction unit 123 can recognize that the calculation node 200 is non-active, and the execution-resource information is not reconstructed. Thus, the DB reconstruction unit 123 determines that execution of the job cannot be continued.

<Step S69> When the execution of the job is determined to be unable to continue, the DB reconstruction unit 123 determines the job ID of the job by reference to the job-input information set 131, and sends to the calculation node 300 an instruction to cut off the job, where the job ID is designated in the instruction. Since the DB reconstruction unit 123 can recognize that the calculation node 200 is non-active, the DB reconstruction unit 123 does not instruct the calculation node 200 to cut off the job.

<Step S70> The job control unit 311 in the calculation node 300 stops the parallel-job execution process 312 in response to the instruction to cut off the job, and removes the execution-resource information set for the job from the intranode job DB 320.

<Step S71> The execution instruction unit 122 in the management node 100 produces the execution-resource information set 133 on the basis of the job-input information set 131 and the node information acquired from the calculation nodes 200 and 300. Then, the execution instruction unit 122 recognizes the calculation nodes to which the job is assigned, by reference to the job-assignment information set 132, and sends a job-execution instruction to the calculation nodes 200 and 300.

<Step S72> The job control unit 211 in the calculation node 200 receives the job-execution instruction, and stores in the intranode job DB 220 the execution-resource information which is sent together with the job-execution instruction.

<Step S73> The job control unit 311 in the calculation node 300 receives the job-execution instruction, and stores in the intranode job DB 320 the execution-resource information which is sent together with the job-execution instruction.

<Step S74> The job control unit 211 in the calculation node 200 starts the parallel-job execution process 212 in response to the job-execution instruction and makes the parallel-job execution process 212 execute the job.

<Step S75> The job control unit 311 in the calculation node 300 starts the parallel-job execution process 312 in response to the job-execution instruction and makes the parallel-job execution process 312 execute the job. Thereafter, the parallel-job execution process 212 in the calculation node 200 and the parallel-job execution process 312 in the calculation node 300 execute the job in corporation with each other.

As explained above, even when the management node 100 fails, the cluster system can continue execution of a parallel job. Therefore, it is possible to minimize the processing delay, which is caused by the failure in the management node 100.

In addition, even when both of the management node 100 and a calculation node concurrently fail, the cluster system can automatically re-execute the parallel job. That is, even when the parallel job is stopped by the failure in the calculation node, the job input device 30 is not required to re-input the job-execution request. Therefore, it is possible to reduce the burden imposed on the system administrator.

3. Second Embodiment

Next, a cluster system of a second embodiment is explained below.

The cluster system according to the second embodiment has a plurality of management nodes, and enables efficient recovery from failure. Since the cluster system according to the first embodiment has only one management node, the job DB is reconstructed after the management node is restarted. Therefore, according to the first embodiment, requests from calculation nodes are required to wait until the failure in the management node is eliminated and the management node is restarted.

On the other hand, according to the second embodiment, the cluster system comprises a management node for the working system and a management node for the standby system. When the management node for the working system fails, the management node for the standby system quickly takes over from the management node for the working system, and reconstructs the job DB. Therefore, it is possible to maximally suppress the occurrence of requests from calculation nodes.

Figure 26:
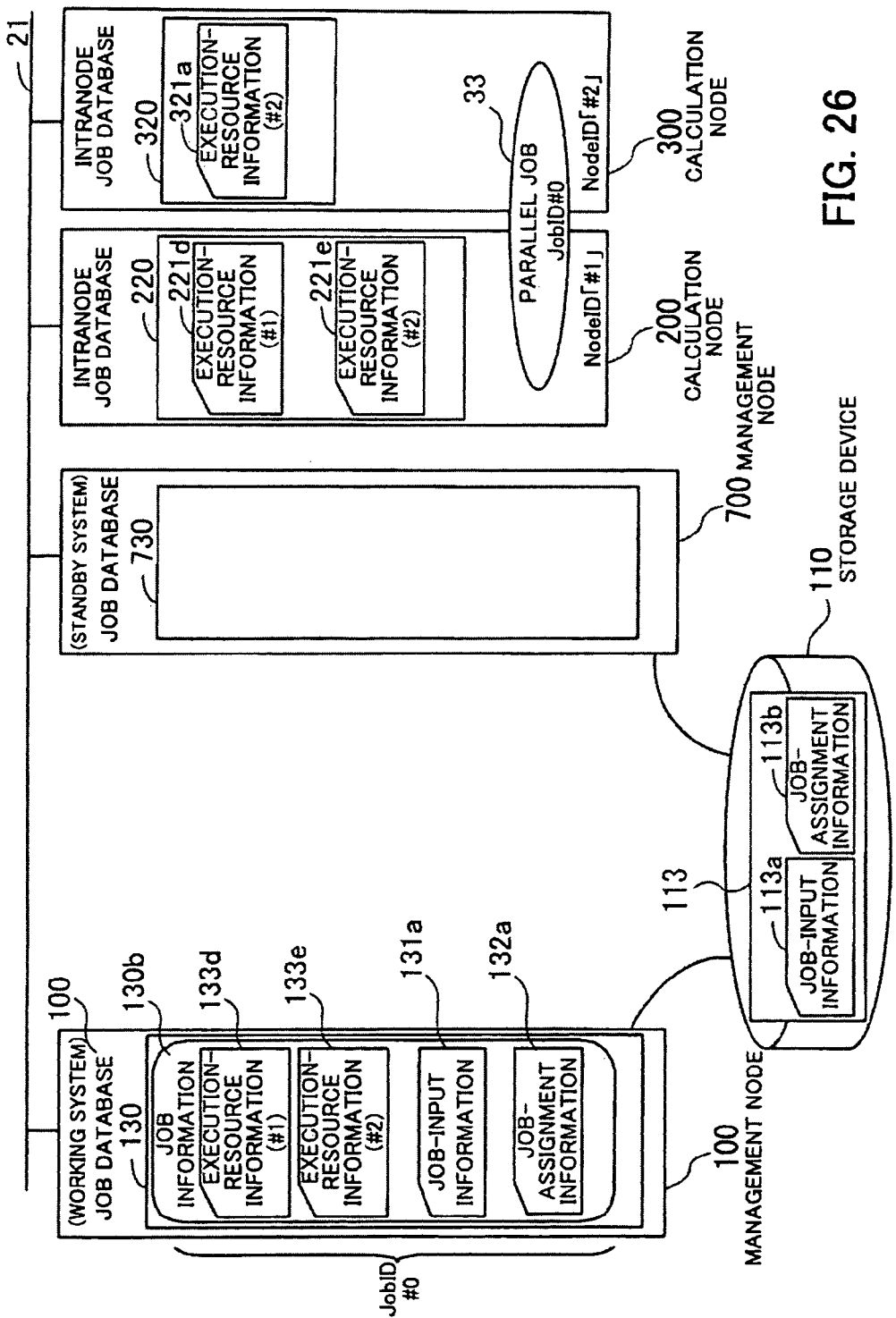
FIG. 26 is a diagram illustrating an exemplary configuration of a cluster system according to a second embodiment.

FIG. 26 is a diagram illustrating an exemplary configuration of the cluster system according to the second embodiment. The cluster system according to the second embodiment is different from the cluster system according to the first embodiment in further comprising an additional management node 700. In FIG. 26, the same elements as the elements in the first embodiment respectively bear the same reference numbers. Therefore, the explanations on such elements are not repeated unless necessary.

The management node 700 is connected through the network 21 to the management node 100 and the calculation nodes 300 and 400. The management node 700 has similar functions to the management node 100. However, the management node 700 does not perform processing for management of jobs while the management node 100 normally operates. Therefore, the job DB 730, which the management node 700 has, contains no data while the management node 100 normally operates.

The management node 100 for the working system manages jobs until the management node 100 fails. For example, the job-information set 130*b* contained in the job DB 130 in the management node 100 corresponds to a parallel job 33, and the execution of the parallel job 33 is assigned to the calculation nodes 200 and 300. The job-information set 130*b* includes job-input information set 131*a*, job-assignment information set 132*a*, and execution-resource information sets 133*d* and 133*e* for the calculation nodes 200 and 300.

The storage device 110 is connected to both of the management node 100 and the management node 700, and the storage device 110 stores a job-data set 113 for the parallel job 33. The job-data set 113 includes job-input information set 113*a* and job-assignment information set 113*b*.

In the above cluster system, the management node 700 keeps track of the operation of the management node 100. When management node 100 for the working system fails, the management node 700 for the standby system takes over the management of the jobs from the management node 100.

Figure 27:
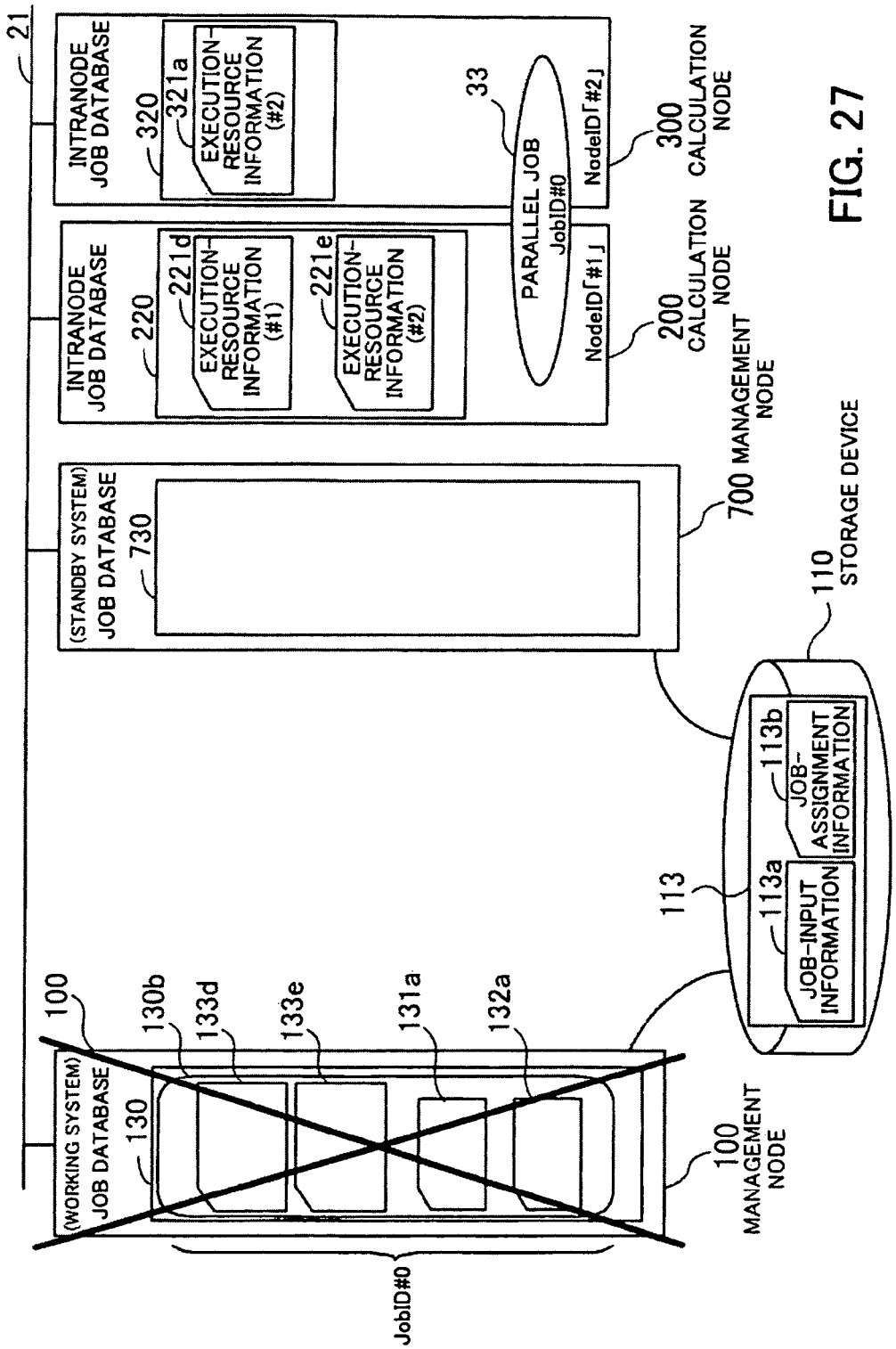
FIG. 27 is a diagram illustrating a situation in which a management node for a working system fails.

FIG. 27 is a diagram illustrating a situation in which the management node 100 for the working system fails. Even when the management node 100 for the working system fails, the calculation nodes 200 and 300 continue execution of the parallel job 33. However, when a request to the management node 100 occurs during the execution, the request is put in a wait state.

The management node 700 for the standby system monitors the operation of the management node 100 for the working system at predetermined times. For example, the management node 700 periodically sends a request for checking the operation of the management node 100. When the management node 700 receives from the management node 100 a response indicating confirmation of the operation, the management node 700 determines that the management node 100 is normally operating. When the management node 700 detects that the management node 100 fails, the management node 700 takes over the management of the jobs from the management node 100.

Figure 28:
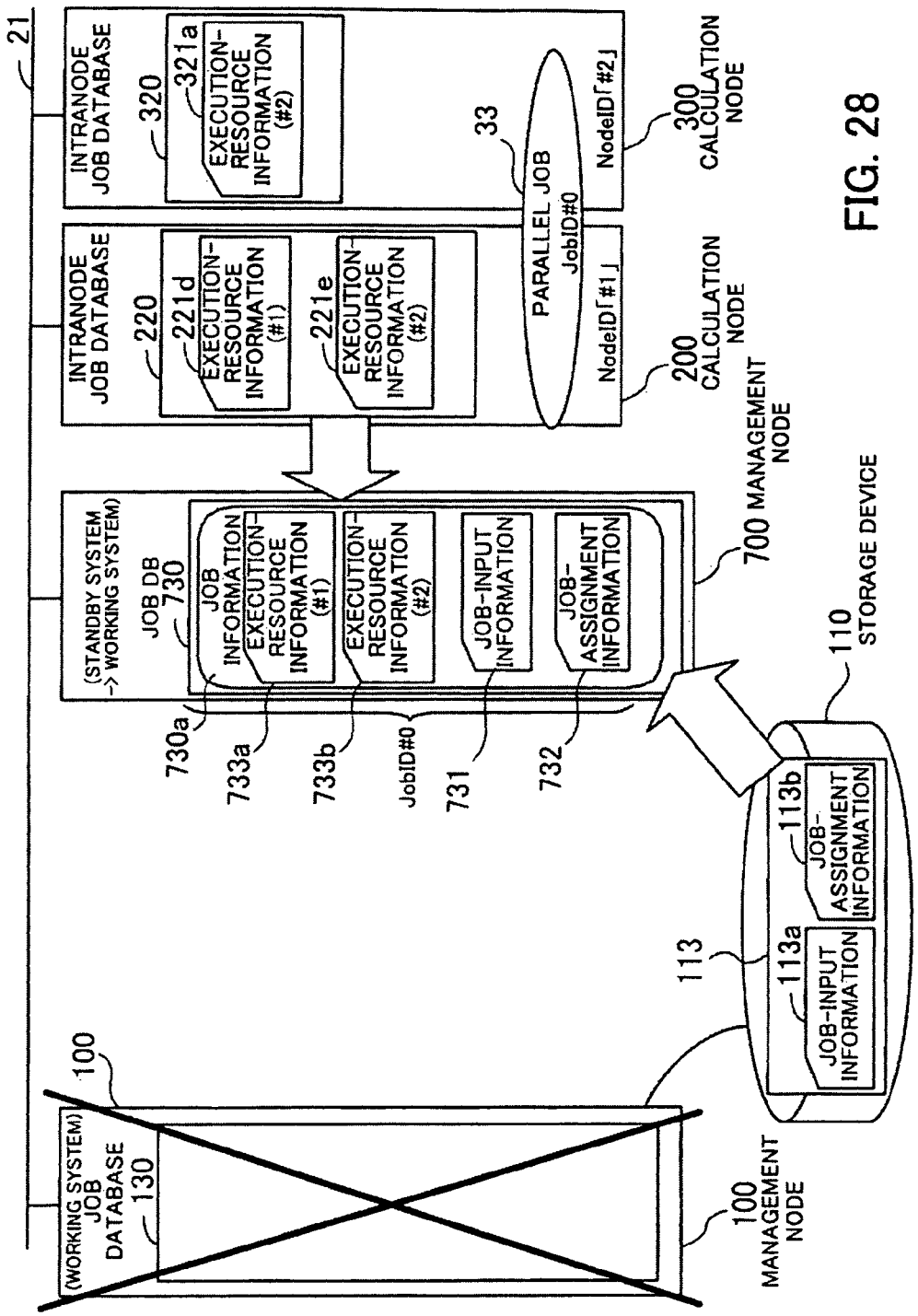
FIG. 28 is a diagram illustrating a situation in which a standby system is switched over to the working system.

FIG. 28 is a diagram illustrating a situation in which the management node 700 for the standby system is switched over to the working system. When the management node 700 detects a failure in the management node 100, the management node 700 collects information from the storage device 110 and the calculation node 200 (which is the job master node). Specifically, the management node 700 collects the job-input information set 113a and the job-assignment information set 113b from the storage device 110, and the execution-resource information (including the execution-resource information sets 221d and 221e) from the calculation node 200. Then, the management node 700 constructs a job-information set 730a on the basis of the collected information. The job-information set 730a includes a job-input information set 731, a job-assignment information set 732, an execution-resource information set 733a for the calculation node 200, and an execution-resource information set 733b for the calculation node 300.

After the construction of the job-information set 730a in the job DB 730, the management node 700 operates as the management node in the working system, and manages jobs. That is, the management node 700 performs processing similar to the processing which the management node 100 performs after the management node 100 is restarted as explained with reference to FIGS. 13 and 25. Thus, the calculation nodes 200 and 300 recognize that the management node 700 is switched to the working system, and send various requests and processing results to the management node 700. Specifically, the calculation nodes 200 and 300 recognize that the management node 700 is switched (raised) to the working system, on the basis of the node-incorporation instruction indicated in step S26 in FIG. 13. Even before the management node 700 is switched (raised) to the working system, the calculation nodes 200 and 300 can continue the execution of the parallel job 33.

As explained above, according to the second embodiment, the management node is duplexes, so that even when the management node 100 for the working system fails, the operation of the cluster system can be quickly restarted by use of the management node 700.

Although, in the above example, the management node 700 for the standby system is dedicatedly provided, alternatively, it is possible to use one of the calculation nodes as the management node for the standby system. In this case, the functions of the management node are implemented in the one of the calculation nodes. When the management node in the working system fails, the calculation node performs the processing as the management node. Thereafter, when the failed management node is restarted, the management node in the working system is switched to the restored management node, i.e., the cluster system can be restored to the original state. Thus, it is possible to minimize the interval in which the functions of the management node are implemented in one of the calculation nodes.

4. Recording Medium Storing Program

The processing functions according to the first and second embodiments which are explained above are realized by computers. In this case, a program describing details of processing for realizing the functions which each of the management nodes and the calculation nodes should have is provided. When a computer executes the program, the processing functions of one of the management nodes and the calculation nodes can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk-Read Only Memory), a CD-R (Recordable)/RW (ReWritable), or the like. The optical magnetic recording medium may be an MO (Magneto-Optical Disk) or the like.

In order to put each program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which should execute the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

5. Other Matters (1) As explained above, according to the present invention, job-input information and job-assignment information are stored in advance in the storage device, and execution-resource information is passed to and held in calculation nodes. Therefore, even when the contents of the job DB in the management node are lost by a restart of the management node, the job information can be reconstructed by collecting the information from the storage device and the calculation nodes.

(2) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A job management device connected with a storage device and a plurality of calculation nodes for instructing the plurality of calculation nodes to execute respective jobs, comprising:
   a main memory;
   a job database which is arranged in said main memory, and stores job information on a job-by-job basis;
   a request reception unit which stores job-input information in both of said storage device and said job database on receipt of a job-execution request for execution of a job, where the job-input information includes details of the job-execution request, a job identifier of the job, and an identifier of a source of the job-execution request;

an execution instruction unit which determines one or more of said plurality of calculation nodes to be one or more job-assigned calculation nodes, sends to the one or more job-assigned calculation nodes a job-execution instruction together with execution-resource information, stores, in said job database in association with said job identifier, job-assignment information and one or more portions of the execution-resource information respectively corresponding to the one or more job-assigned calculation nodes, and stores the job-assignment information in association with the job identifier in said storage device, where execution of the job is assigned to the job-assigned calculation nodes, the execution-resource information indicates resources to be used in execution of said job, and the job-assignment information includes a list of the one or more job-assigned calculation nodes; and a reconstruction unit which collects said job-input information and said job-assignment information from said storage device, collects said execution-resource information from said one or more job-assigned calculation nodes, and reconstructs said job information in said job database, when contents of the job database are lost by processing for restarting said job management device.

2. The job management device according to claim 1, wherein said execution instruction unit determines one of said one or more job-assigned calculation nodes to be a job master node, determines the one or more job-assigned calculation nodes other than the job master node to be one or more job slave nodes, sends to the job master node said job-execution instruction together with all of said one or more portions of the execution-resource information respectively corresponding to the one or more job-assigned calculation nodes, and sends to each of the one or more job slave nodes said job-execution instruction together with one of the one or more portions of said execution-resource information corresponding to said each of the one or more job-assigned calculation nodes, and when the contents of the job database are lost by said processing for restarting said job management device, said reconstruction unit collects said job-input information and said job-assignment information from said storage device, collects from said job master node all of the one or more portions of the execution-resource information respectively corresponding to the one or more job-assigned calculation nodes, and reconstructs said job information in said job database.

3. The job management device according to claim 1, wherein when said job management device is restarted, said execution instruction unit sends a node-incorporation instruction to said one or more job-assigned calculation nodes, makes an attempt to acquire node information which is sent from the one or more job-assigned calculation nodes in response to the node-incorporation instruction, determines whether or not execution of said job can be continued, on the basis of whether or not the node information is acquired from all of the one or more job-assigned calculation nodes, instructs the one or more job-assigned calculation nodes to restart execution of the job in the case where execution of the job is determined to be able to continue, and instructs the one or more job-assigned calculation nodes to stop execution of the job and sends to each of the one or more job-assigned calculation nodes said job-execution instruction together with one of said one or more portions of the execution-resource information corresponding to said each of the one or more job-assigned calculation nodes in the case where execution of the job is determined to be unable to continue.

4. A cluster system for receiving and executing jobs, comprising:

a storage device;
a plurality of calculation nodes; and
a management node including,
a main memory,
a job database which is arranged in said main memory, and stores job information on a job-by-job basis,
a request reception unit which stores job-input information in both of said storage device and said job database on receipt of a job-execution request for execution of a job, where the job-input information includes details of the job-execution request, a job identifier of the job, and an identifier of a source of the job-execution request,
an execution instruction unit which determines one or more of said plurality of calculation nodes to be one or more job-assigned calculation nodes, sends to the one or more job-assigned calculation nodes a job-execution instruction together with execution-resource information, stores, in said job database in association with said job identifier, job-assignment information and one or more portions of the execution-resource information respectively corresponding to the one or more job-assigned calculation nodes, and stores the job-assignment information in association with the job identifier in said storage device, where execution of the job is assigned to the job-assigned calculation nodes, the execution-resource information indicates resources to be used in execution of said job, and the job-assignment information includes a list of the one or more job-assigned calculation nodes, and
a reconstruction unit which collects said job-input information and said job-assignment information from said storage device, collects said execution-resource information from said one or more job-assigned calculation nodes, and reconstructs said job information in said job database, when contents of the job database are lost by processing for restarting said management node.

5. The cluster system according to claim 4, wherein said execution instruction unit determines one of said one or more job-assigned calculation nodes to be a job master node, determines the one or more job-assigned calculation nodes other than the job master node to be one or more job slave nodes, sends to the job master node said job-execution instruction together with all of said one or more portions of the execution-resource information respectively corresponding to the one or more job-assigned calculation nodes, and sends to each of the one or more job slave nodes the job-execution instruction together with one of the one or more portions of said execution-resource information corresponding to said each of the one or more job-assigned calculation nodes, and when the contents of the job database are lost by said processing for restarting said job management device, said reconstruction unit collects said job-input information and said job-assignment information from said storage device, collects from the job master node all of the one or more portions of the execution-resource information respectively corresponding to the one or more job-assigned calculation nodes, and reconstructs said job information in said job database.

6. The cluster system according to claim 5, wherein said reconstruction unit attaches to said job-execution instruction an instruction to operate as the job master node when the job-execution instruction is sent to the job master node, and sends to each of said plurality of calculation nodes an instruction to send execution-resource information when the collection of the execution-resource information from the one or more job-assigned calculation nodes is necessary, and each of the plurality of calculation nodes sends the execution-resource information to said management node in response to the instruction to send the execution-resource information only when said each of the one or more job-assigned calculation nodes receives the instruction to operate as the job master node.

7. A cluster system for receiving and executing jobs, comprising:
- a storage device;
- a plurality of calculation nodes; and
- a first management node including, a first main memory, a first job database which is arranged in said first main memory, and stores job information on a job-by-job basis,
    - a request reception unit which stores job-input information in both of said storage device and said first job database on receipt of a job-execution request for execution of a job, where the job-input information includes details of the job-execution request, a job identifier of the job, and an identifier of a source of the job-execution request, and
    - a first execution instruction unit which determines one or more of said plurality of calculation nodes to be one or more job-assigned calculation nodes, sends to the one or more job-assigned calculation nodes a job-execution instruction together with execution-resource information, stores, in said first job database in association with said job identifier, job-assignment information and one or more portions of the execution-resource information respectively corresponding to the one or more job-assigned calculation nodes, and stores the job-assignment information in association with the job identifier in said storage device, where execution of said job is assigned to the job-assigned calculation nodes, the execution-resource information indicates resources to be used in execution of the job, and the job-assignment information includes a list of the one or more job-assigned calculation nodes; and
- a second management node including,
    - a second main memory,
    - a second job database which is arranged in said second main memory, and stores said job information on a job-by-job basis,
    - a reconstruction unit which collects said job-input information and said job-assignment information from said storage device, collects said execution-resource information from said one or more job-assigned calculation nodes, and reconstructs said job information in said second job database, when failure in said first management node is detected, and
    - a second execution instruction unit which sends a node-incorporation instruction to said one or more job-assigned calculation nodes when failure in said first management node is detected.

8. The cluster system according to claim 7, wherein after said second execution instruction unit sends a node-incorporation instruction to said one or more job-assigned calculation nodes, said second execution instruction unit makes an attempt to acquire node information which is sent from the one or more job-assigned calculation nodes in response to the node-incorporation instruction, determines whether or not execution of said job can be continued, on the basis of whether or not the node information is acquired from all of the one or more job-assigned calculation nodes, and instructs the one or more job-assigned calculation nodes to stop execution of the job and sends to each of the one or more job-assigned calculation nodes said job-execution instruction together with one of said one or more portions of the execution-resource information corresponding to said each of the one or more job-assigned calculation nodes in the case where execution of the job is determined to be unable to continue.

9. A non-transitory computer-readable storage medium storing a job management program to be executed by a computer which comprises a main memory and is connected with a storage device and a plurality of calculation nodes for instructing the plurality of calculation nodes to execute respective jobs, said job management program realizes in the computer:
- a job database which is arranged in said main memory, and stores job information on a job-by-job basis;
- a request reception unit which stores job-input information in both of said storage device and said job database on receipt of a job-execution request for execution of a job, where the job-input information includes details of the job-execution request, a job identifier of the job, and an identifier of a source of the job-execution request;
- an execution instruction unit which determines one or more of said plurality of calculation nodes to be one or more job-assigned calculation nodes, sends to the one or more job-assigned calculation nodes a job-execution instruction together with execution-resource information, stores, in said job database in association with said job identifier, job-assignment information and one or more portions of the execution-resource information respectively corresponding to the one or more job-assigned calculation nodes, and stores the job-assignment information in association with the job identifier in said storage device, where execution of the job is assigned to the job-assigned calculation nodes, the execution-resource information indicates resources to be used in execution of said job, and the job-assignment information includes a list of the one or more job-assigned calculation nodes; and
- a reconstruction unit which collects said job-input information and said job-assignment information from said storage device, collects said execution-resource information from said one or more job-assigned calculation nodes, and reconstructs said job information in said job database, when contents of the job database are lost by processing for restarting said computer.

* * * * *